US012603989B2

(12) United States Patent  
    Martinelli et al.

(10) Patent No.: US 12,603,989 B2  
(45) Date of Patent: Apr. 14, 2026

(54) IMAGE DATA DECOMPRESSION

(71) Applicant: Imagination Technologies Limited,  
        Kings Langley (GB)

(72) Inventors: Ilaria Martinelli, Hertfordshire (GB);  
        Simon Fenney, Hertfordshire (GB);  
        Kellie Marks, Sydney (AU); Paul  
        Higginbottom, Sydney (AU)

(73) Assignee: Imagination Technologies Limited,  
        Kings Langley (GB)

( * ) Notice: Subject to any disclaimer, the term of this  
        patent is extended or adjusted under 35  
        U.S.C. 154(b) by 291 days.

(21) Appl. No.: 18/532,587

(22) Filed: Dec. 7, 2023

(65) Prior Publication Data

US 2024/0236295 A1      Jul. 11, 2024

(30) Foreign Application Priority Data

Dec. 7, 2022    (GB) ...................................... 2218417  
Dec. 7, 2022    (GB) ...................................... 2218418

(51) Int. Cl.  
    H04N 19/103        (2014.01)  
    H04N 19/136        (2014.01)  
        (Continued)

(52) U.S. Cl.  
    CPC ......... H04N 19/103 (2014.11); H04N 19/136  
        (2014.11); H04N 19/157 (2014.11);  
        (Continued)

(58) Field of Classification Search  
    None  
    See application file for complete search history.

(56) References Cited

U.S. PATENT DOCUMENTS 9,275,605 B2    3/2016  Longhurst et al.  
10,757,415 B2    8/2020  Martinelli et al.  
        (Continued)

FOREIGN PATENT DOCUMENTS

EP        3783891 A1    2/2021  
EP        3783892 A1    2/2021  
        (Continued)

*Primary Examiner* — Dov Popovici  
(74) *Attorney, Agent, or Firm* — Potomac Law Group,  
PLLC; Vincent M DeLuca

(57)        ABSTRACT

Image element values are determined from a compressed block of image data relating to a reference channel and non-reference channels. Compressed channel data is used to determine an initial data value relating to a channel. A decompressed data value is determined for the non-reference channels by: (i) reading an indication of a compression mode, the compression mode being either a channel decorrelating mode or a non-channel decorrelating mode, (ii) if the compression mode is non-channel decorrelating mode, determining the decompressed data value for the non-reference channel to be the determined initial data value relating to the non-reference channel for the image element value; (iii) if the compression mode is a channel decorrelating mode, determining the decompressed data value for the non-reference channel to be a function of the determined initial data value relating to the non-reference channel and the determined initial data value relating to one of the reference channels.

20 Claims, 9 Drawing Sheets

(51) Int. Cl.

| | | |
|---|---|---|
| *H04N 19/157* | (2014.01) | |
| *H04N 19/176* | (2014.01) | |
| *H04N 19/184* | (2014.01) | |
| *H04N 19/186* | (2014.01) | |
| *H04N 19/189* | (2014.01) | |
| *H04N 19/46* | (2014.01) | |
| *H04N 19/70* | (2014.01) | |

(52) U.S. Cl.

CPC ......... *H04N 19/176* (2014.11); *H04N 19/184* (2014.11); *H04N 19/186* (2014.11); *H04N 19/189* (2014.11); *H04N 19/46* (2014.11); *H04N 19/70* (2014.11)

(56) References Cited

U.S. PATENT DOCUMENTS

| | | | |
|---|---|---|---|
| 11,323,718 B2 | 5/2022 | Martinelli et al. | |
| 11,611,754 B2 | 3/2023 | Martinelli et al. | |
| 2017/0178653 A1 | 6/2017 | Davis | |
| 2017/0278215 A1 | 9/2017 | Appu et al. | |
| 2021/0304446 A1 | 9/2021 | Yang | |
| 2024/0314291 A1* | 9/2024 | Martinelli | H04N 19/186 |

FOREIGN PATENT DOCUMENTS

| | | | |
|---|---|---|---|
| GB | 2593522 A | 9/2021 | |
| GB | 2593523 A | 9/2021 | |

* cited by examiner

100

200

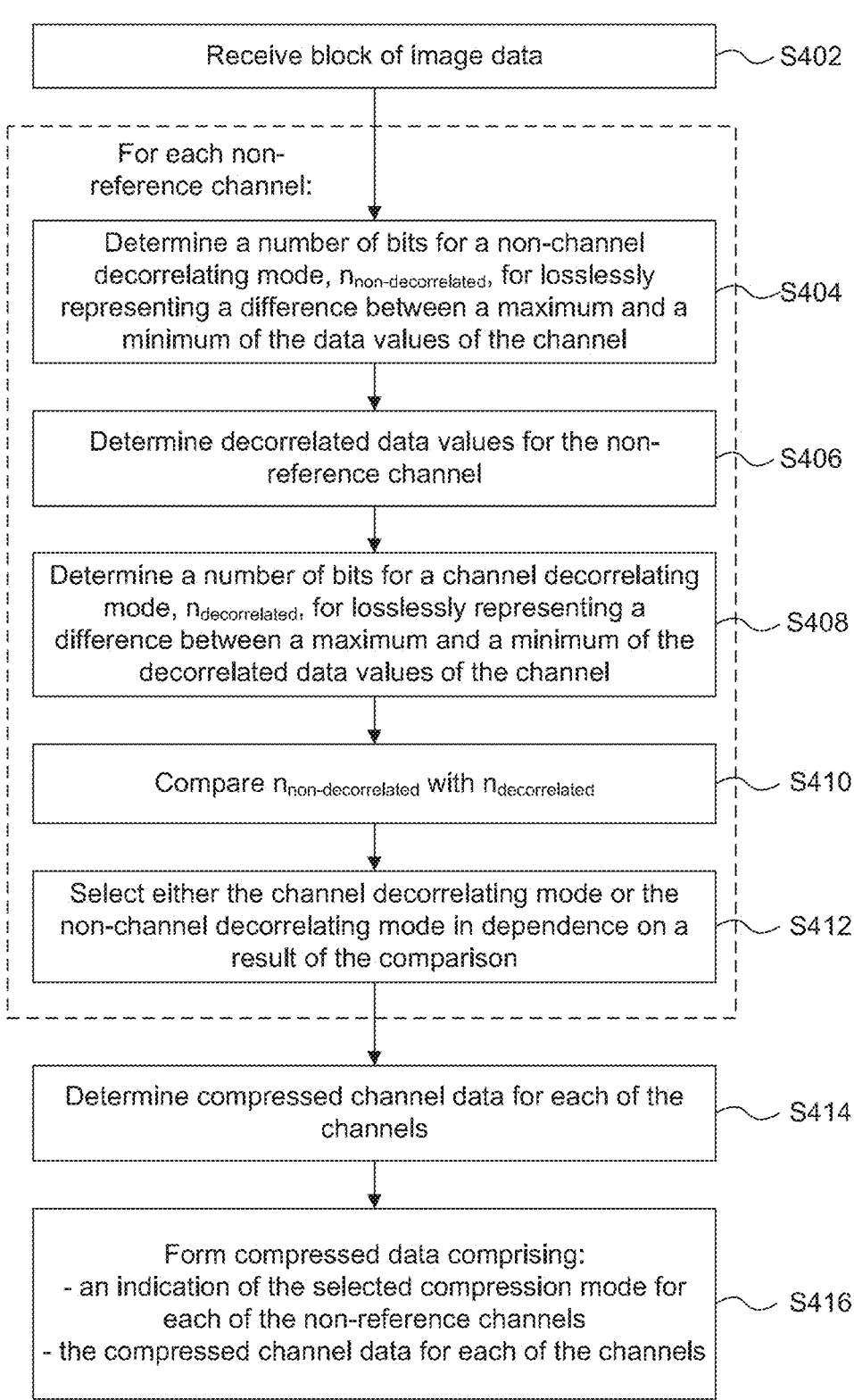

| Receive block of image data | S402 |

For each non-reference channel:

Determine a number of bits for a non-channel decorrelating mode, $n_{non-decorrelated}$, for losslessly representing a difference between a maximum and a minimum of the data values of the channel — S404

Determine decorrelated data values for the non-reference channel — S406

Determine a number of bits for a channel decorrelating mode, $n_{decorrelated}$, for losslessly representing a difference between a maximum and a minimum of the decorrelated data values of the channel — S408

Compare $n_{non-decorrelated}$ with $n_{decorrelated}$ — S410

Select either the channel decorrelating mode or the non-channel decorrelating mode in dependence on a result of the comparison — S412

Determine compressed channel data for each of the channels — S414

Form compressed data comprising:
- an indication of the selected compression mode for each of the non-reference channels
- the compressed channel data for each of the channels — S416

FIGURE 4

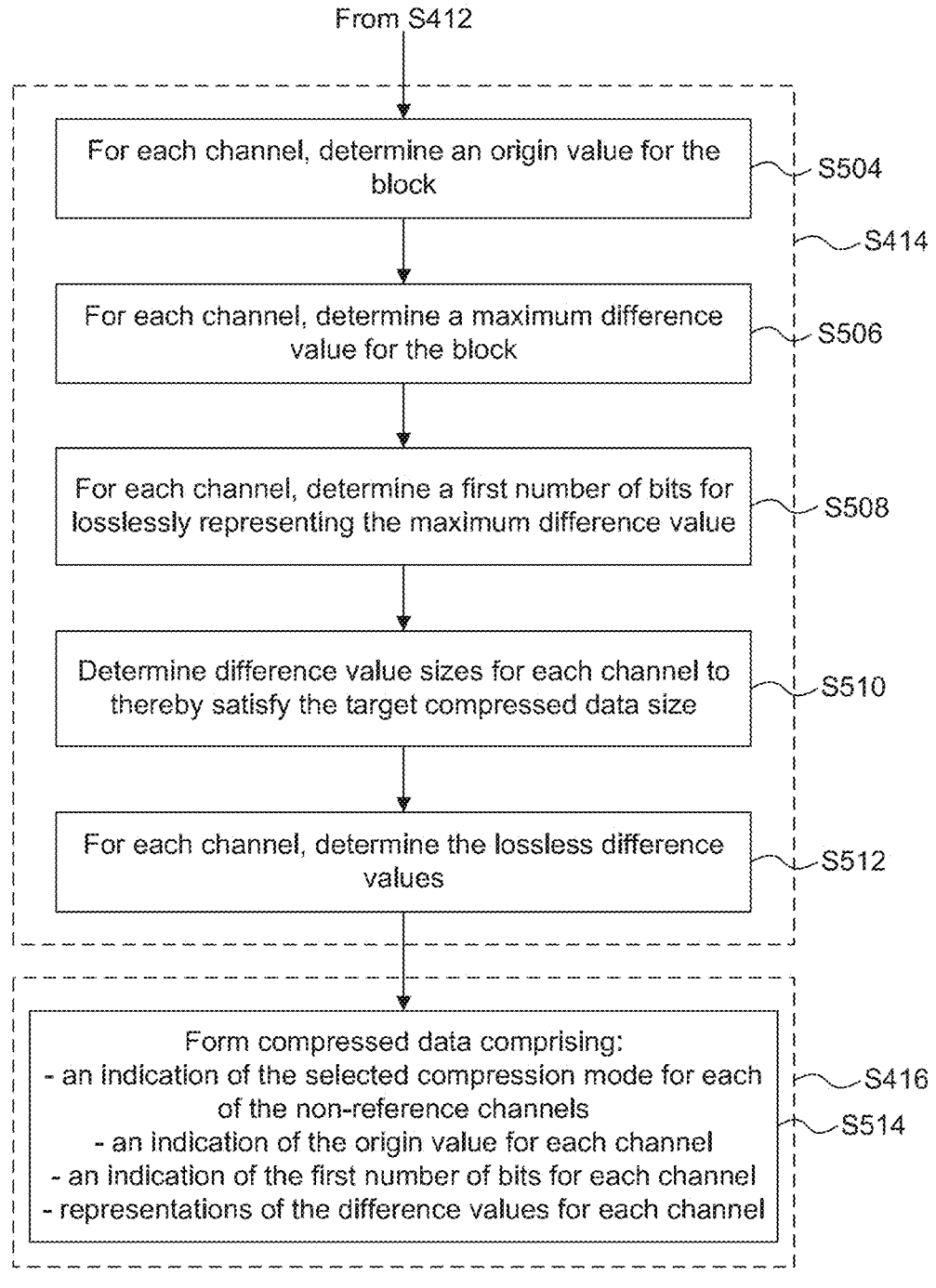

From S412

For each channel, determine an origin value for the block — S504

S414

For each channel, determine a maximum difference value for the block — S506

For each channel, determine a first number of bits for losslessly representing the maximum difference value — S508

Determine difference value sizes for each channel to thereby satisfy the target compressed data size — S510

For each channel, determine the lossless difference values — S512

Form compressed data comprising:
- an indication of the selected compression mode for each of the non-reference channels
- an indication of the origin value for each channel
- an indication of the first number of bits for each channel
- representations of the difference values for each channel

128 bits

610

612          614          616          618

32 bits          3 bits          13 bits          16 bits

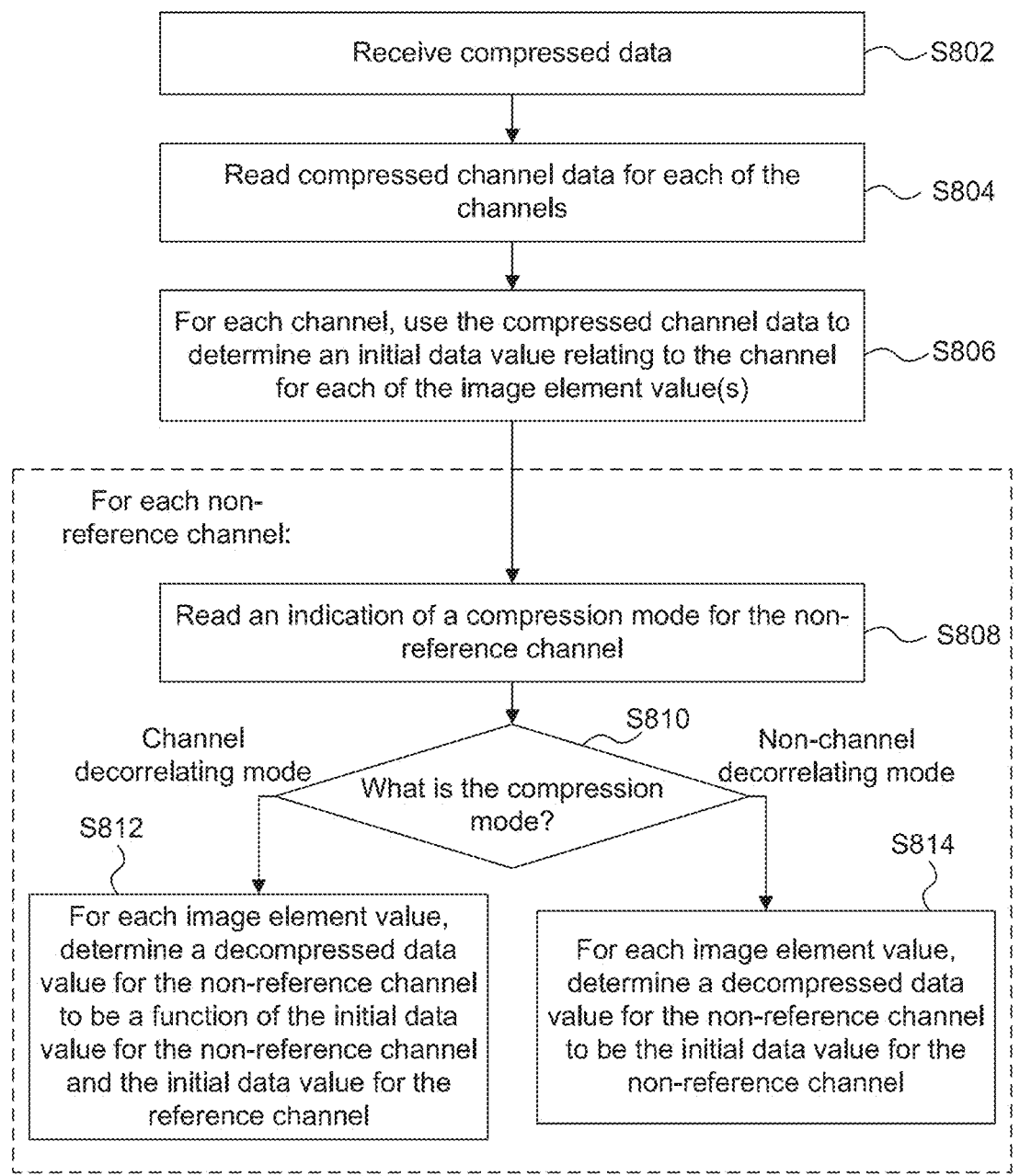

| | |
|---|---|
| Receive compressed data | S802 |

| | |
|---|---|
| Read compressed channel data for each of the channels | S804 |

| | |
|---|---|
| For each channel, use the compressed channel data to determine an initial data value relating to the channel for each of the image element value(s) | S806 |

For each non-reference channel:

| | |
|---|---|
| Read an indication of a compression mode for the non-reference channel | S808 |

S810

What is the compression mode?

Channel decorrelating mode

Non-channel decorrelating mode

S812

For each image element value, determine a decompressed data value for the non-reference channel to be a function of the initial data value for the non-reference channel and the initial data value for the reference channel

S814

For each image element value, determine a decompressed data value for the non-reference channel to be the initial data value for the non-reference channel

FIGURE 8

From S802

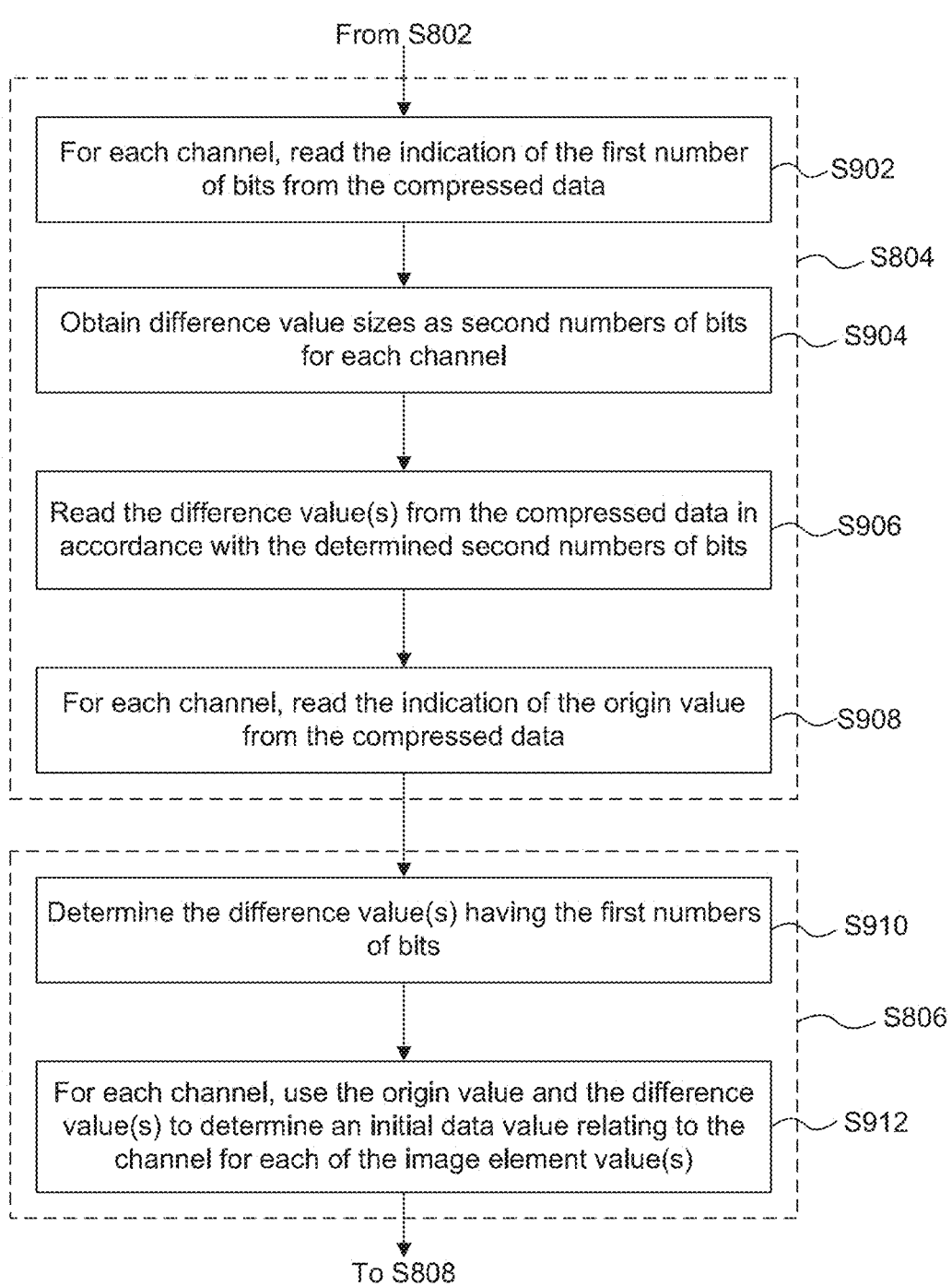

For each channel, read the indication of the first number of bits from the compressed data ⎯ S902

S804

Obtain difference value sizes as second numbers of bits for each channel ⎯ S904

Read the difference value(s) from the compressed data in accordance with the determined second numbers of bits ⎯ S906

For each channel, read the indication of the origin value from the compressed data ⎯ S908

Determine the difference value(s) having the first numbers of bits ⎯ S910

S806

For each channel, use the origin value and the difference value(s) to determine an initial data value relating to the channel for each of the image element value(s) ⎯ S912

IMAGE DATA DECOMPRESSION

CROSS-REFERENCE TO RELATED APPLICATIONS AND CLAIM OF PRIORITY

This application claims foreign priority under 35 U.S.C. 119 from United Kingdom Application Nos. 2218418.8 and 2218417.0, both filed 7 Dec. 2022, the contents of which are incorporated by reference herein in their entirety.

TECHNICAL FIELD

This disclosure relates to data compression and data decompression.

BACKGROUND

Data compression, both lossless and lossy, is desirable in many applications in which data is to be stored in, and/or read from memory. By compressing data before storage of the data in memory, the amount of data transferred to the memory may be reduced. An example of data for which data compression is particularly useful is image data. The term 'image data' is used herein to refer to two-dimensional data that has values corresponding to respective pixel or sample locations of an image. For example, the image may be produced as part of a rendering process on a Graphics Processing Unit (GPU). Image data may include, but is not limited to, depth data to be stored in a depth buffer, pixel data (e.g. colour data) to be stored in a frame buffer, texture data to be stored in a texture buffer, surface normal data to be stored in a surface normal buffer and lighting data to be stored in a lighting buffer. These buffers may be any suitable type of memory, such as cache memory, separate memory subsystems, memory areas in a shared memory system or some combination thereof.

A GPU may be used to process data in order to generate image data. For example, a GPU may determine pixel values (e.g. colour values) of an image to be stored in a frame buffer which may be output to a display. GPUs usually have highly parallelised structures for processing large blocks of data in parallel. There is significant commercial pressure to make GPUs (especially those intended to be implemented on mobile/embedded devices) operate with reduced latency, reduced power consumption and with a reduced physical size, e.g. a reduced silicon area. Competing against these aims is a desire to use higher quality rendering algorithms to produce higher quality images. Reducing the memory bandwidth (i.e. reducing the amount of data transferred between the GPU and a memory can significantly reduce the latency and the power consumption of the system, which is why compressing the data before transferring the data can be particularly useful. The same is true, to a lesser extent, when considering data being moved around within the GPU itself. Furthermore, the same issues may be relevant for other processing units, e.g. central processing units (CPUs), as well as GPUs.

FIG. 1 shows an example graphics processing system 100 which may be implemented in an electronic device, such as a mobile/embedded device. The graphics processing system 100 comprises a GPU 102 and a memory 104 (e.g. graphics memory). Data, which may be compressed data, can be transferred in either direction, between the GPU 102 and the memory 104.

The GPU 102 comprises processing logic 106, a memory interface 108, a compression unit 110, and a decompression unit 112. In some examples, the compression and decompression units may be combined into a single unit which can perform both compression and decompression.

In operation, the GPU 102 may process regions of image data individually. The regions may for example represent rectangular (including square) portions (or "tiles") of the rendering space (i.e. the two-dimensional space representing, for example, an image area to be rendered). The processing logic 106 may perform rasterization of graphics primitives, such as, but not limited to, triangles and lines, using known techniques such as depth testing and texture mapping. The processing logic 106 may contain cache units to reduce memory traffic. Some data is read or written by the processing logic 106, from or to the memory 104 via the memory interface 108. In the example shown in FIG. 1, data which is being written from the processing logic 106 to the memory 104 is passed from the processing logic 106 to the memory interface 108 via the compression unit 110. The compression unit 110 may compress the data before passing it to the memory interface. Similarly, in the example shown in FIG. 1, data which is being read from the memory 104 by the processing logic 106 is passed from the memory interface 108 to the processing logic 106 via the decompression unit 112. The decompression unit 112 may decompress the data (if it was compressed) before passing it to the processing logic 106. The use of the compression unit 110 and decompression unit 112 means that compressed data can be passed between the memory interface 108 and the memory 104, thereby reducing the amount of data that is to be transferred across the external memory bus to the memory 104.

As is known to a person of skill in the art, the processing logic 106 of the GPU 102 may generate a set of one or more colour values (e.g. RGB or RGBA) for each pixel in the render space and cause the colour values to be stored in the frame buffer (e.g. in the memory 104). The collection of colour values for a frame may be referred to herein as colour data or image data. The processing logic 106 may also generate other image data, such as depth data, surface normal data, lighting data, etc., and may store those image data values in one or more buffers in memory. These buffers may, in some cases, be referred to as frame buffers, while in other cases the term "frame buffer" may be reserved for buffers which store colour values or which store data to be sent to a display. In some graphics rendering systems the image data values stored in a buffer for a particular render may be used by the processing logic 106 when performing one or more subsequent renders. For example, colour values generated by one render may represent a texture which can be stored in memory 104 (e.g. in a compressed form), and the texture can be read from the memory 104 (e.g. and decompressed) to be applied as a texture to a surface in one or more subsequent renders. Similarly, surface normal values generated for a geometric model in one render may be used to apply lighting effects to the same model during the rendering of one or more subsequent renders. Furthermore, surface depth values generated and stored in one render can be read back in for use in the rendering of one or more subsequent renders for the same model.

Since the image data (e.g. colour data) can be quite large the memory bandwidth associated with writing image data to a buffer in memory and reading the image data from the buffer in memory may be a significant portion of the total memory bandwidth of the graphics processing system and/or the GPU. As a result, the image data is often compressed, via the compression unit 110, prior to being stored in a buffer and decompressed, via the decompression unit 112, after being read from the buffer.

When a lossless compression technique is used to compress data and then a complementary lossless decompression technique is used to decompress the data, the original data can be recovered, with no loss of data (assuming no errors occurred during the compression or decompression processes). The extent to which the data is compressed can be expressed as a compression ratio, where the compression ratio is given by dividing the size of the uncompressed data by the size of the compressed data. The compression ratio achieved by a lossless compression technique typically depends upon the data that is being compressed. For example, lossless compression techniques tend to be able to achieve relatively high compression ratios when compressing highly correlated data; whereas lossless compression techniques tend to achieve relatively low compression ratios when compressing uncorrelated (e.g. random) data. Therefore, it is difficult to guarantee that a lossless compression technique will achieve a particular compression ratio (e.g. a compression ratio of 2:1). Therefore, if only a lossless compression technique is used then the system typically must be able to handle situations in which a desired compression ratio (e.g. 2:1) is not achieved, and for example, sometimes no compression at all results from using a lossless compression technique.

In some situations, a guaranteed compression ratio can be considered more important than a guarantee that no data will be lost during the compression. For example, a guaranteed compression ratio allows a reduction in a memory footprint that is necessary to ensure that a compressed block of data can be stored. Having a guaranteed compression ratio may allow the size (e.g. silicon area) of the memory 104 to be reduced. In these situations, a lossy compression technique can be used, which can achieve a guaranteed compression ratio, although some data may be lost during the compression process.

Two UK patents, GB2586531B and GB2586532B, describe methods for compressing and decompressing a block of image data to satisfy a target level of compression.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a computer-implemented method of performing decompression to determine one or more image element values from compressed data, wherein the compressed data represents a block of image data comprising a plurality of image element values, each image element value comprising a plurality of data values relating to a respective plurality of channels, wherein the plurality of channels comprises at least one reference channel and a plurality of non-reference channels, the method comprising:

reading, from the compressed data, compressed channel data for each of the channels;

for each of the channels, using the compressed channel data for the channel to determine an initial data value relating to the channel for each of the one or more image element values being decompressed;

for each of the one or more image element values being decompressed, determining a decompressed data value for each of the non-reference channels by:

reading, from the compressed data, an indication of a compression mode for the non-reference channel for the block, wherein the compression mode is either a channel decorrelating mode or a non-channel decorrelating mode, and if the compression mode for the non-reference channel is the non-channel decorrelating mode, determining the decompressed data value for the non-reference channel to be the determined initial data value relating to the non-reference channel for the image element value; and if the compression mode for the non-reference channel is the channel decorrelating mode, determining the decompressed data value for the non-reference channel to be a function of the determined initial data value relating to the non-reference channel and the determined initial data value relating to one of the at least one reference channel for the image element value.

The compression mode for a first of the plurality of non-reference channels may be the channel decorrelating mode, and the compression mode for a second of the plurality of non-reference channels may be the non-channel decorrelating mode.

Said function may be a sum.

For each of the one or more image element values being decompressed, for each of the at least one reference channel, the determined initial data value relating to the reference channel for the image element value may be a decompressed data value for the reference channel.

Said plurality of channels may comprise a Red channel, a Green channel, a Blue channel and optionally an Alpha channel.

Said reading compressed channel data for each of the channels may comprise:

reading, from the compressed data, an indication of an origin value for each of the channels; and for each of the channels, reading representations of difference values from the compressed data, wherein the difference values for the channel may represent differences between the data values and the origin value for the channel for the one or more image element values being decompressed from the compressed data;

wherein said, for each of the channels, using the compressed channel data for the channel to determine an initial data value relating to the channel for each of the one or more image element values being decompressed may comprise:

for each of the channels, determining the initial data value relating to the channel for each of the one or more image element values being decompressed using: (i) the indication of the origin value for the channel read from the compressed data, and (ii) one of the representations of difference values read from the compressed data.

Said determining, for each of the channels, the initial data value relating to the channel for each of the one or more image element values being decompressed may comprise summing the origin value for the channel and the determined difference value for the channel for the image element value.

Said determining, for each of the channels, the initial data value relating to the channel for each of the one or more image element values being decompressed may comprise subtracting the determined difference value for the channel for the image element value from the origin value for the channel.

For each of the non-reference channels, the indication of the origin value for the non-reference channel may be read from the compressed data as a number representing: (i) the origin value for the non-reference channel, or (ii) a difference between the origin value for the non-reference channel and the origin value for one of the at least one reference channel for the block.

Said reading compressed channel data for each of the channels further may comprise:

reading, from the compressed data, for each of the channels, an indication of a first number of bits for the representations of the difference values for the channel;

wherein said determining the initial data values relating to the channels for each of the one or more image element values being decompressed may comprise:

based on the representations of the difference values read from the compressed data, determining, for each of the channels and for each of the one or more image element values being decompressed, a difference value in accordance with said first number of bits for the channel.

Said determined difference value for a channel for an image element value may have said first number of bits for the channel.

For each of the channels, each of the representations of the difference values for the channel may have the first number of bits for the channel.

Said reading representations of difference values from the compressed data may comprise:

obtaining, for each of the channels, a second number of bits, wherein each of the representations of the difference values for each of the channels has the second number of bits for that channel; and using the obtained second numbers of bits for the respective channels to read the representations of the difference values for the one or more image element values being decompressed from the compressed data.

Said determining, for each of the channels and for each of the one or more image element values being decompressed, a difference value in accordance with said first number of bits for the channel may comprise adding zero, one or more least significant bits to the representations of the difference values read from the compressed data to thereby determine the difference values having said first number of bits for each of the channels.

The zero, one or more least significant bits which are added to the representations of the difference values read from the compressed data may be determined by bit replication of a corresponding zero, one or more most significant bits of the representations of the difference values read from the compressed data.

Said obtaining, for each of the one or more channels, a second number of bits may comprise using the first number of bits for each of the one or more channels to determine the second number of bits for the channel in accordance with a predetermined scheme.

Said obtaining, for each of the one or more channels, a second number of bits may comprise reading an indication of said second number of bits for the channel from the compressed data.

The compressed data may be in a compressed block of data comprising:

a header portion, which has a fixed size, and which comprises: (i) the indication of the origin value for each of the channels, and (ii) the indication of the compression mode for each of the non-reference channels; and a body portion, which has a variable size, and which comprises the representations of the difference values for each of the channels.

The header portion may further comprise the indication of the first number of bits for each of the channels.

The image element values may be pixel values, texel values, depth values, surface normals or lighting values.

The method may further comprise outputting determined data values of the one or more image element values being decompressed for further processing.

There is provided a decompression unit configured to perform decompression to determine one or more image element values from compressed data, wherein the compressed data represents a block of image data comprising a plurality of image element values, each image element value comprising a plurality of data values relating to a respective plurality of channels, wherein the plurality of channels comprises at least one reference channel and a plurality of non-reference channels, the decompression unit comprising:

decompression logic configured to:

read, from the compressed data, compressed channel data for each of the channels; and for each of the channels, use the compressed channel data for the channel to determine an initial data value relating to the channel for each of the one or more image element values being decompressed; and channel decorrelation logic configured to determine, for each of the one or more image element values being decompressed, a decompressed data value for each of the non-reference channels by:

reading, from the compressed data, an indication of a compression mode for the non-reference channel for the block, wherein the compression mode is either a channel decorrelating mode or a non-channel decorrelating mode, and if the compression mode for the non-reference channel is the non-channel decorrelating mode, determining the decompressed data value for the non-reference channel to be the determined initial data value relating to the non-reference channel for the image element value; and if the compression mode for the non-reference channel is the channel decorrelating mode, determining the decompressed data value for the non-reference channel to be a function of the determined initial data value relating to the non-reference channel and the determined initial data value relating to one of the at least one reference channel for the image element value.

The decompression logic may comprise:

initial data value determination logic configured to read, from the compressed data, an indication of an origin value for each of the channels; and difference value determination logic configured to read, from the compressed data, for each of the channels, representations of difference values from the compressed data, wherein the difference values for the channel represent differences between the initial data values and the origin value for the channel for the one or more image element values being decompressed from the compressed data;

wherein the initial data value determination logic may be further configured to determine, for each of the channels, the initial data value relating to the channel for each of the one or more image element values being decompressed using: (i) the indication of the origin value for the channel read from the compressed data, and (ii) one of the representations of difference values read from the compressed data.

The difference value determination logic may be further configured to:

read, from the compressed data, for each of the channels, an indication of a first number of bits for the representations of the difference values for the channel; and based on the representations of the difference values read from the compressed data, determine, for each of the channels and for each of the one or more image element values being decompressed, a difference value in accordance with said first number of bits for the channel.

The difference value determination logic may be further configured to:

obtain, for each of the channels, a second number of bits, wherein each of the representations of the difference values for each of the channels has the second number of bits for that channel; and use the obtained second numbers of bits for the respective channels to read the representations of the difference values for the one or more image element values being decompressed from the compressed data.

There may be provided a decompression unit configured to perform any of the methods described herein.

There may be provided a computer-implemented method of compressing a block of image data, wherein the block of image data comprises a plurality of image element values, each image element value comprising a plurality of data values relating to a respective plurality of channels, wherein the plurality of channels comprises a reference channel and one or more non-reference channels, the method comprising:

for each of the one or more non-reference channels:

determining a number of bits for a non-channel decorrelating mode, $n_{non-decorrelated}$, for losslessly representing a difference between a maximum and a minimum of the data values of the non-reference channel for the block;

determining decorrelated data values for the non-reference channel by finding, for each image element value in the block, a difference between the data value of the non-reference channel and the data value of the reference channel;

determining a number of bits for a channel decorrelating mode, $n_{decorrelated}$, for losslessly representing a difference between a maximum and a minimum of the decorrelated data values of the non-reference channel for the block;

comparing the determined number of bits for the non-channel decorrelating mode, $n_{non-decorrelated}$, with the determined number of bits for the channel decorrelating mode, $n_{decorrelated}$; and selecting either the channel decorrelating mode or the non-channel decorrelating mode in dependence on a result of the comparison, wherein if the channel decorrelating mode is selected then the decorrelated data values for the non-reference channel for the block are used in place of the data values of the non-reference channel for the block for determining compressed channel data for the non-reference channel;

determining compressed channel data for each of the channels for the block; and forming compressed data comprising:

an indication of the selected mode for each of the one or more non-reference channels, and the determined compressed channel data for each of the channels.

There may be provided a compression unit configured to compress a block of image data, wherein the block of image data comprises a plurality of image element values, each image element value comprising a plurality of data values relating to a respective plurality of channels, wherein the plurality of channels comprises a reference channel and one or more non-reference channels, the compression unit comprising:

analyser logic configured to, for each of the one or more non-reference channels:

determine a number of bits for a non-channel decorrelating mode, $n_{non-decorrelated}$, for losslessly representing a difference between a maximum and a minimum of the data values of the non-reference channel for the block;

determine decorrelated data values for the non-reference channel by finding, for each image element value in the block, a difference between the data value of the non-reference channel and the data value of the reference channel;

determine a number of bits for a channel decorrelating mode, $n_{decorrelated}$, for losslessly representing a difference between a maximum and a minimum of the decorrelated data values of the non-reference channel for the block;

compare the determined number of bits for the non-channel decorrelating mode, $n_{non-decorrelated}$, with the determined number of bits for the channel decorrelating mode, $n_{decorrelated}$; and select either the channel decorrelating mode or the non-channel decorrelating mode in dependence on a result of the comparison, wherein if the channel decorrelating mode is selected then the decorrelated data values for the non-reference channel for the block are used in place of the data values of the non-reference channel for the block for determining compressed channel data for the non-reference channel;

compression logic configured to:

determine compressed channel data for each of the channels for the block; and form compressed data, wherein the compressed data comprises:

an indication of the selected mode for each of the one or more non-reference channels, and the determined compressed channel data for each of the channels.

The compression unit and/or decompression unit may be embodied in hardware on an integrated circuit. There may be provided a method of manufacturing, at an integrated circuit manufacturing system, a compression unit and/or decompression unit. There may be provided an integrated circuit definition dataset that, when processed in an integrated circuit manufacturing system, configures the system to manufacture a compression unit and/or decompression unit. There may be provided a non-transitory computer readable storage medium having stored thereon a computer readable description of a compression unit and/or decompression unit that, when processed in an integrated circuit manufacturing system, causes the integrated circuit manufacturing system to manufacture an integrated circuit embodying a compression unit and/or decompression unit.

There may be provided an integrated circuit manufacturing system comprising: a non-transitory computer readable storage medium having stored thereon a computer readable description of the compression unit and/or decompression unit; a layout processing system configured to process the computer readable description so as to generate a circuit layout description of an integrated circuit embodying the compression unit and/or decompression unit; and an integrated circuit generation system configured to manufacture the compression unit and/or decompression unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 4 is a flow chart for a method of compressing a block of image data;

FIG. 5 is a flow chart for some of the steps of the method of compressing a block of image data in an example which satisfies a target level of compression;

FIG. 8 is a flow chart for a method of performing decompression to determine one or more image element values from compressed data;

FIG. 9 is a flow chart for some of the steps of the method of performing decompression to determine one or more image element values from compressed data in an example which satisfies a target level of compression;

Figure 1:
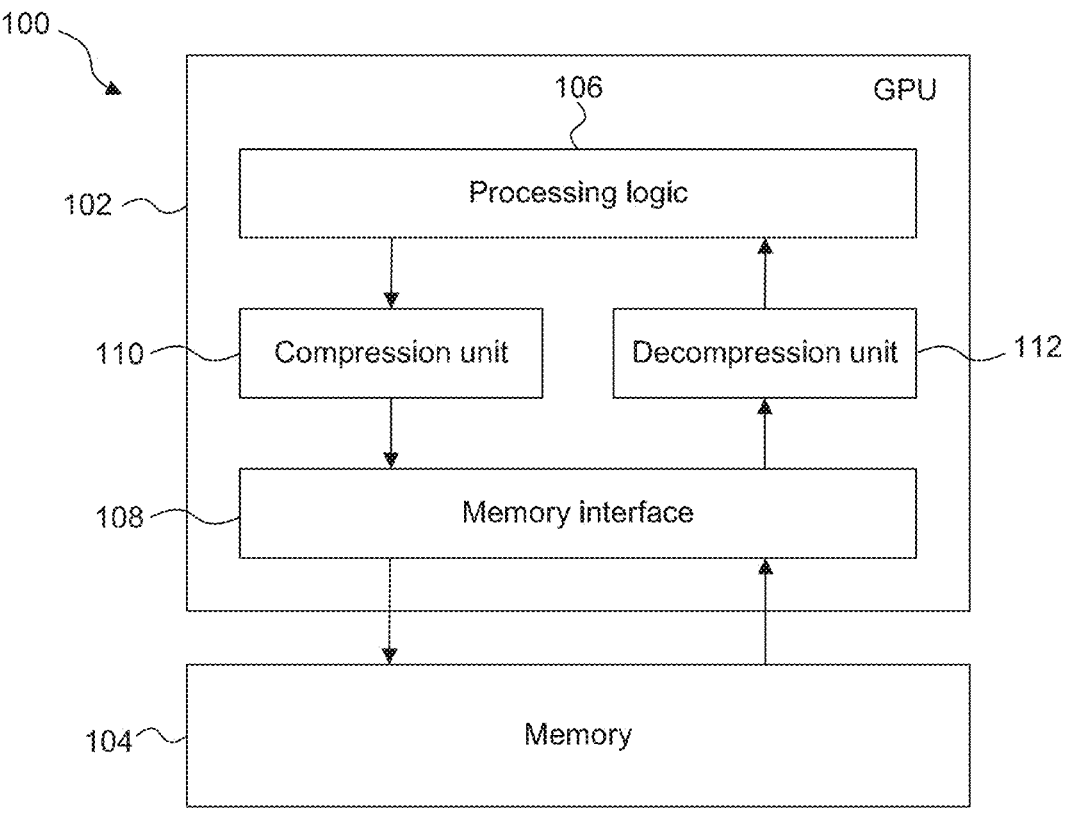
FIG. 1 shows a graphics processing system in which a compression unit and a decompression unit are implemented within a graphics processing unit.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, in a compression scheme, it is generally advantageous to reduce the size of compressed data, but there may be a trade off between reducing the size of the compressed data and reducing the extent of errors that may be introduced due to using a lossy compression technique. Examples described herein provide opportunities for reducing the size of compressed data and/or for reducing the extent of errors that may be introduced due to using a lossy compression technique without increasing the size of the compressed data. In particular, in examples described herein, the compression scheme can select between two compression modes based on which of the modes will result in compressed data having a smaller size. In examples described herein the two modes are: (i) a channel decorrelating mode, and (ii) a non-channel decorrelating mode. An indication of the selected mode can be included in the compressed data so that a decompression unit can correctly decompress the compressed data. For example, a block of image data to be compressed can be represented as a 2D array of image element values (e.g. pixel values), where each of the image element values comprises a plurality of data values relating to a respective plurality of channels. For example, there may be three channels (e.g. Red (R), Green (G), Blue (B) channels) or four channels (e.g. Red (R), Green (G), Blue (B) and Alpha (A) channels). One of the channels (e.g. the Green channel) can be designated as being a reference channel, and the other channels (e.g. the Red and Blue channels) can be designated as being non-reference channels. In a channel decorrelating mode, decorrelated data values may be determined for a non-reference channel and then used in place of the data values for the non-reference channel for determining compressed channel data for the non-reference channel. The decorrelated data values for a non-reference channel may be determined by finding, for each image element value in a block, a difference between the data value of the non-reference channel and the data value of the reference channel. The selection of either the channel decorrelating mode or the non-channel decorrelating mode can be made for each non-reference channel, such that different modes may be selected for different non-reference channels for a block of image element values being compressed. Making the selection at the granularity of the channels allows a suitable mode to be selected for each non-reference channel independently. In order to facilitate this, an indication of the selected mode is included in the compressed data for each of the non-reference channels.

Some of the examples described herein implement lossless compression and decompression techniques. The lossless compression and decompression techniques are not guaranteed to satisfy a target level of compression, but (provided no errors occur in the compression or decompression processes) when the lossless compression technique is used to compress data and then the complementary lossless decompression technique is used to decompress the data, the original data can be recovered, with no loss of data.

However, as described above, it can be useful to have a compression technique (and a complementary decompression technique) which is guaranteed to satisfy a target level of compression (e.g. guaranteed to satisfy a compression ratio, such as 2:1) without too much loss in quality of the data, e.g. without visually perceptible artefacts being introduced into an image due to loss introduced by the compression. A target level of compression is satisfied if the compression ratio achieved is equal to or greater than that of the target level. Some previous high-end lossy compression algorithms can achieve fixed compression ratios without too much loss in quality of the data, but these previous high-end lossy compression algorithms involve performing complex operations (such as filtering, multiplication and division operations) e.g. on fixed-point values and may require internal buffering of values during the compression process. As such, these previous high-end lossy compression algorithms are often considered unsuitable for use in small, low cost and/or low power computing systems, such as may be implemented in mobile devices such as smart phones and tablets or other devices where size, cost and/or power are particularly constrained.

All of the examples of compression and decompression described herein (both lossless and lossy examples) can be implemented in a small, low cost and low power computing system. The examples described herein are simple (i.e. efficient) to implement, e.g. in fixed function circuitry. For example, they may be performed by performing simple operations such as addition operations, subtraction operations and compare operations, and without performing more complex operations (which may be expansive and/or expensive, e.g. in terms of the amount of data needed to represent the values, or the size of the hardware logic required to implement them) such as multiplication operations or division operations, and without requiring as much internal buffering of values during the compression or decompression process as in the previous high-end compression and decompression algorithms mentioned above. In these examples, these simple operations (e.g. addition operations, subtraction operations and compare operations) are "integer operations", meaning that they operate on integer numbers, e.g. operate on the image element values in the integer format.

The compression techniques described herein may be implemented in a compression unit implemented in dedicated hardware, e.g. using fixed-function circuitry. Similarly, the decompression techniques described herein may be implemented in a decompression unit implemented in dedicated hardware, e.g. using fixed-function circuitry. In these examples, the compression unit and the decompression unit may be small in terms of physical size (e.g. silicon area) when compared with previous high-end compression and decompression units implemented in hardware. The compression units and decompression units described herein are suitable for being implemented in a small, low-cost processing unit (e.g. a GPU or a CPU), with small silicon area and low power consumption and low latency. This is achieved without degrading the quality of the data (e.g. the image quality) too much.

Furthermore, in some examples described herein the compression techniques allow the compression to be lossless if this will satisfy a target level of compression for compressing a block of image data, but if lossless compression of a block of image data would not satisfy the target level of compression then the compression may become lossy in order to guarantee that the target level of compression is satisfied. In these examples, rather than having separate lossless and lossy compression units, a single compression unit can be used to perform either lossless or lossy compression to compress a block of image data. The use of a single compression unit for performing lossless and lossy compression can reduce the total hardware implemented in a device (e.g. it can reduce the silicon area implemented in a device) and may reduce the power consumption of the device compared to implementing separate units for lossless compression and for lossy compression. Similarly, in examples described herein, rather than having separate lossless and lossy decompression units, a single decompression unit can be used to perform either lossless or lossy decompression to compress a block of image data. The use of a single decompression unit for performing lossless and lossy decompression can reduce the total hardware implemented in a device (e.g. it can reduce the silicon area implemented in a device) and may reduce the power consumption of the device compared to implementing separate units for lossless decompression and for lossy decompression.

Figure 2:
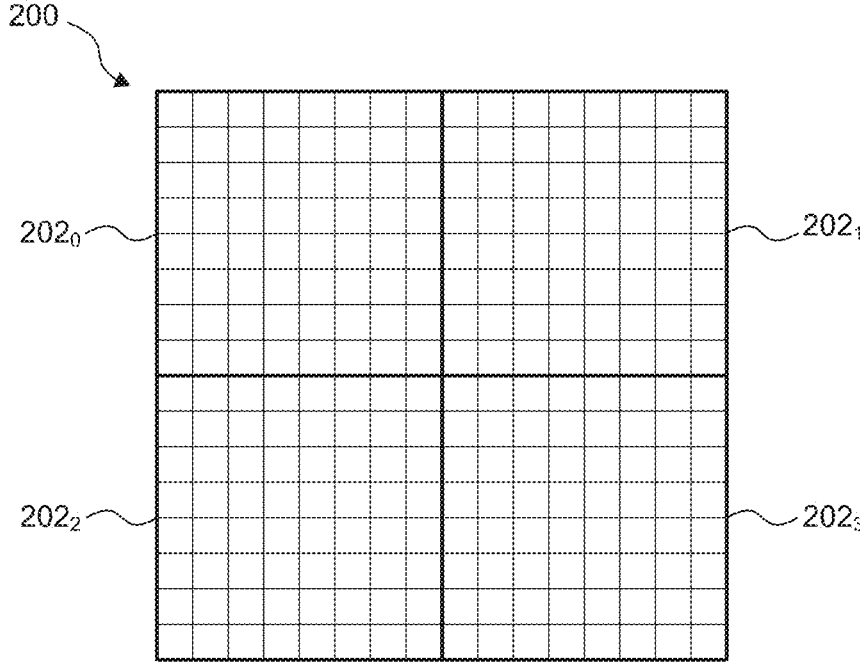
FIG. 2 shows an array of image data comprising blocks of image data.

Image data to be compressed can be represented as a 2D array of image element values (e.g. pixel values). Each of the image element values comprises a plurality of data values relating to a respective plurality of channels, e.g. Red (R), Green (G), Blue (B) and Alpha (A) channels. FIG. 2 shows an array of image data 200 comprising blocks of image data. In this example, the array of image data 200 represents an image represented by pixel values, wherein the blocks of image data are 8×8 blocks of pixel values denoted $202_0$, $202_1$, $202_2$ and $202_3$ in FIG. 2. In other examples, the blocks of image data could be a different size and/or shape (e.g. 16×4 blocks of pixel values). Furthermore, in other examples, there may be more (or fewer) than four blocks of image data in an array of image data.

The examples described herein relate to compressing and decompressing a block of pixel values, wherein the pixel values represent an image. However, it is to be understood that pixel values are just one example of image element values which may be compressed using the techniques described herein. More generally, a block of image data can be compressed to form a compressed block of data, and a compressed block of data can be decompressed to form a block of image data, wherein the image data comprises a plurality of image element values. To give some examples, the image element values may be: (i) texel values representing a texture, (ii) pixel values representing an image, (iii) depth values representing depths of surfaces within a scene at different sample positions, (iv) surface normal values representing the directions of normal vectors of surfaces within a scene at different sample positions, or (v) lighting values representing lighting on surfaces within a scene at different sample positions. The lighting values represent a "light map". A light map can be considered to be a type of texture, such that it can be used and processed in the same way as a texture. Pixel values and texel values are examples of colour values (where pixel values represent an image and texel values represent a texture). These colour values are multi-channel values. For example, colour values may be in a RGB format wherein there is a Red channel (R), a Green channel (G) and a Blue channel (B). In other examples, colour values may be in a RGBA format wherein there is a Red channel (R), a Green channel (G), a Blue channel (B) and an Alpha channel (A). In other examples, colour values may be in a YCbCr format wherein they have a luma channel (Y), a first chroma channel (Cb) and a second chroma channel (Cr). As is known in the art, there are many other formats that multi-channel colour values may have. Each channel of the multi-channel colour values comprises data values which relate to that particular channel. Depth values, surface normal values and lighting values would normally be considered to be single-channel values, but they may be processed as if they were multi-channel values, and packed into a multi-channel format, in accordance with the principles of the examples described herein. As a simple example, a 2×4 tile of depth values $$(A \text{ to } H): \begin{pmatrix} A & B & C & D \\ E & F & G & H \end{pmatrix}$$

can be considered to be equivalent to a 2×2 tile of depth values, where each depth value comprises two channels:

$$\begin{pmatrix} (A, B) & (C, D) \\ (E, F) & (G, H) \end{pmatrix}.$$

In the examples described herein, when we refer to "pixel values" we may be referring to the values of one of the channels of multi-channel values.

In examples described herein, the compressed data is stored as a compressed block of data. For example, the headers and difference values may be stored in the same contiguous block of compressed data. However, more generally, it is to be understood that the compressed data does not need to be stored as a block, e.g. as a contiguous block, of data. For example, the headers and the difference values may be stored separately, e.g. in separate sections of memory.

Compression

Figure 3:
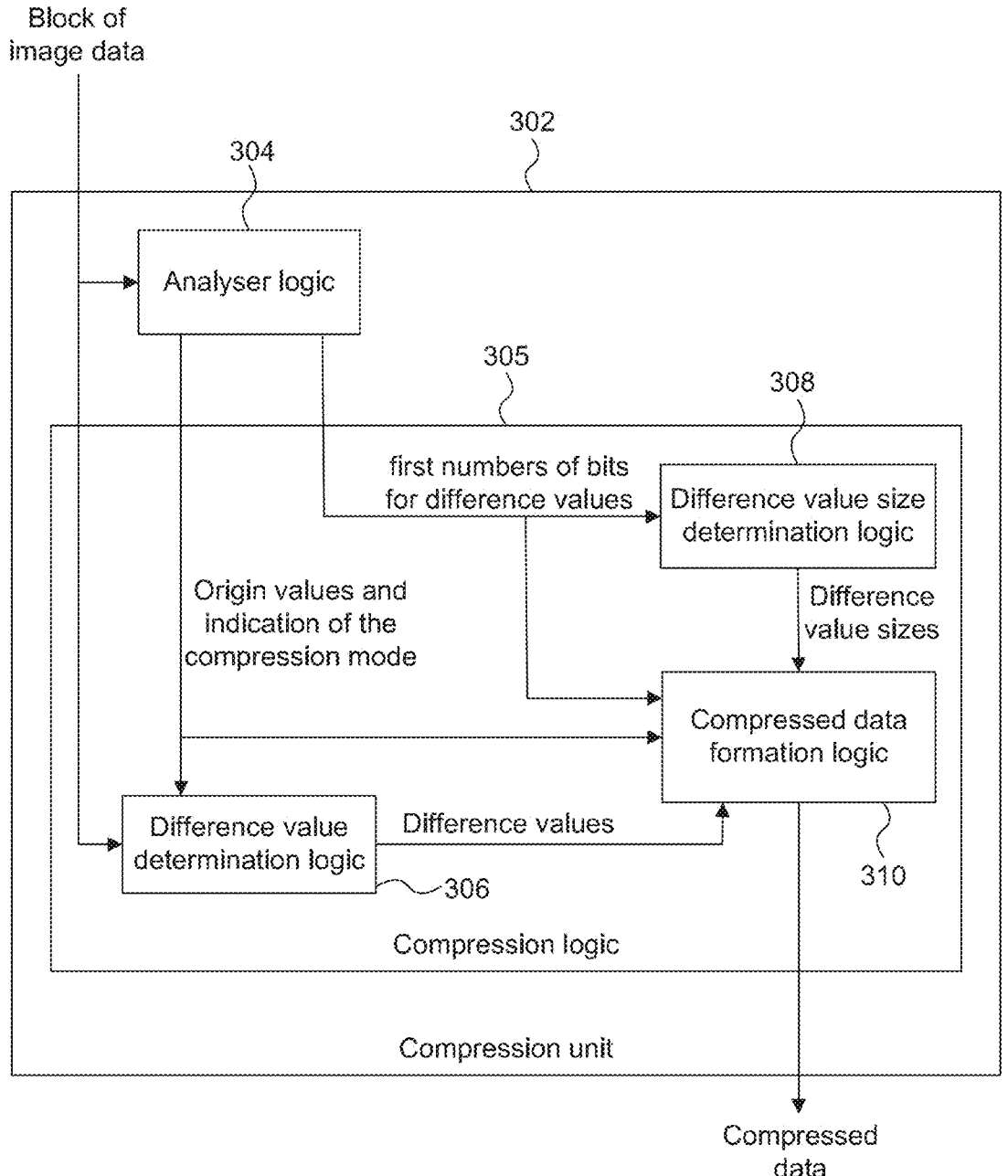
FIG. 3 shows a compression unit.

Examples of compression techniques are now described with reference to FIGS. 3 to 6b. FIG. 3 shows a compression unit 302 configured to perform compression on a block of image data. The compression unit 302 may be implemented as the compression unit 110 in the graphics processing system shown in FIG. 1. The compression unit 302 comprises analyser logic 304 and compression logic 305. The compression logic 305 comprises difference value determination logic 306, difference value size determination logic 308 and compressed data formation logic 310. Each of the logic blocks 304 to 310 implemented in the compression unit 302 may be implemented in hardware (e.g. dedicated hardware implemented with fixed-function circuitry), software (e.g. as a software module executing on a processor), or a combination thereof. Implementing the logic blocks in hardware would normally provide a lower latency of operation than implementing the logic blocks in software. However, implementing the logic blocks in software allows more flexibility in terms of altering the functionality of the logic blocks after manufacture of the compression unit 302. So in some systems, a hardware implementation may be more suitable than a software implementation (e.g. when compression needs to be performed quickly), whereas in some other systems, a software implementation may be more suitable than a hardware implementation (e.g. when the functionality of the compression unit needs to be variable).

FIG. 4 shows a flow chart for a method of compressing a block of image data using the compression unit 302.

In step S402 a block of image data is received at the compression unit 302. As described above, the block of image data comprises a plurality of image element values, each image element value comprising a plurality of data values relating to a respective plurality of channels. The plurality of channels comprises a reference channel and one or more non-reference channels. In the examples described below each image element value comprises data values relating to Red (R), Green (G) and Blue (B) channels, and the reference channel is the Green channel. The Green channel normally correlates better than the Red and Blue channels with the brightness of image element values, which is a reason for choosing the Green channel to be the reference channel, but in other examples a channel other than the Green channel (e.g. the Red channel or the Blue channel) may be the reference channel.

Steps S404 to S412 are performed for each of the non-reference channels (e.g. for the Red channel and for the Blue channel) in order to select either the channel decorrelating mode or the non-channel decorrelating mode for determining compressed channel data for the non-reference channel.

In particular, in step S404 the analyser logic 304 determines a number of bits for a non-channel decorrelating mode, $n_{non-decorrelated}$, for losslessly representing a difference between a maximum and a minimum of the data values of the non-reference channel for the block. To do this the analyser logic 304 can find the maximum data value in the non-reference channel for the block, find the minimum data value in the non-reference channel for the block, and subtract the minimum data value from the maximum data value to determine the difference ($\Delta_{non-decorrelated}$) between the maximum and the minimum data values.

In the examples described herein the data values are in an unsigned integer format, wherein if the data values each have m bits then the data values are in a range from 0 to $2^m - 1$. For example, m may be 8 such that the data values are in a range from 0 to 255. In other examples, m may be a different value and/or may be in a signed format. It is noted that a person skilled in the art would know how to map a value in a signed format to an equivalent offset unsigned value, e.g. involving inverting the most significant bit (MSB). The determined difference ($\Delta_{non-decorrelated}$) between the maximum and the minimum data values for a non-reference channel is represented in an unsigned integer format, and the number of bits for a non-channel decorrelating mode, $n_{non-decorrelated}$, for losslessly representing this determined difference is the number of bits used to represent the determined difference in an unsigned integer format without any leading zeros. Therefore, $n_{non-decorrelated}$ will be in a range from 0 to m. If the determined difference ($\Delta_{non-decorrelated}$) is 0 then $n_{non-decorrelated}=0$. If the determined difference is greater than zero then, for the determined difference ($\Delta_{non-decorrelated}$) being an integer in a range such that $2^{k-1} \leq \Delta_{non-decorrelated} < 2^k$, the analyser logic 304 determines that $n_{non-decorrelated}=k$, where k is an integer such that $1 \leq k \leq m$.

In step S406 the analyser logic 304 determines decorrelated data values for the non-reference channel by finding, for each image element value in the block, a difference between the data value of the non-reference channel and the data value of the reference channel. For example, where $R_i$, $G_i$ and $B_i$ are the data values of the Red, Green and Blue channels respectively for the $i^{th}$ image element value of the block, and where the Green channel is the reference channel, the decorrelated data value of the Red channel for the $i^{th}$ image element value of the block ($R'_i$) may be determined such that $R'_i = R_i - G_i$, and the decorrelated data value of the Blue channel for the $i^{th}$ image element value of the block ($B'_i$) may be determined such that $B'_i = B_i - G_i$.

In step S408 the analyser logic 304 determines a number of bits for a channel decorrelating mode, $n_{decorrelated}$, for losslessly representing a difference between a maximum and a minimum of the decorrelated data values of the non-reference channel for the block. To do this the analyser logic 304 can find the maximum decorrelated data value in the non-reference channel for the block, find the minimum decorrelated data value in the non-reference channel for the block, and subtract the minimum decorrelated data value from the maximum decorrelated data value to determine the difference ($\Delta_{decorrelated}$) between the maximum and the minimum decorrelated data values.

The decorrelated data values may be positive, zero or negative. In the examples described herein the decorrelated data values are in a signed integer format (e.g. two's complement format), wherein the initial decorrelated data values each have m+1 bits, and the decorrelated data values are in a range from $-(2^m-1)$ to $2^m-1$. For example, as mentioned above, m may be 8 such that the decorrelated data values are in a range from −255 to 255. In other examples, m may be a different value. Note however, that since the non-decorrelated data values will never need more than m bits, a decorrelated case requiring m+1 bits is redundant as it is automatically inferior to the non-decorrelated case. The example will therefore assume at most m bits may be required. Taking this one step further, an example may also elect to consider only those cases needing at most m−1 bits since, with m bits, there would be no storage saving relative to a worst case non-decorrelated data values. The determined difference ($\Delta_{decorrelated}$) between the maximum and the minimum decorrelated data values for a non-reference channel is represented in an unsigned integer format, and the number of bits for a channel decorrelating mode, $n_{decorrelated}$, for losslessly representing this determined difference is the number of bits used to represent the determined difference in an unsigned integer format without any leading zeros. Therefore, an $n_{decorrelated}$ will be in a range from 0 to $n_{decorrelated,max}$, where $n_{decorrelated,max}$ may be m+1, or if the decorrelated cases requiring m+1 bits are never selected then $n_{decorrelated,max}$ may be m. Furthermore, if the decorrelated cases requiring at least m bits are never selected then $n_{decorrelated,max}$ may be m−1. If the determined difference ($\Delta_{decorrelated}$) is 0 then $n_{decorrelated}$=0. If the determined difference is greater than zero then, for the determined difference ($\Delta_{decorrelated}$) being an integer in a range such that $2^{k-1} \leq \Delta_{decorrelated} < 2^k$, the analyser logic 304 determines that $n_{decorrelated}$=k, where k is an integer such that $1 \leq k \leq n_{decorrelated,max}$.

In step S410 the analyser logic 304 compares the determined number of bits for the non-channel decorrelating mode, $n_{non-decorrelated}$, with the determined number of bits for the channel decorrelating mode, $n_{decorrelated}$. In particular, the analyser logic 304 can determine whether $n_{decorrelated} < n_{non-decorrelated}$. If the analyser logic 304 finds that $n_{decorrelated} < n_{non-decorrelated}$, this indicates that the spread (or "range") of the decorrelated data values is smaller than the spread (or "range") of the (non-decorrelated) data values in the block for the channel in question, and as such it is likely that the decorrelated data values can be compressed to a greater extent than the (non-decorrelated) data values in the block for the channel in question. For example, as described in more detail below, if $n_{decorrelated} < n_{non-decorrelated}$ then difference values representing differences between the decorrelated data values in the block for the channel can be represented (losslessly) using fewer bits than difference values representing differences between the (non-decorrelated) data values in the block for the channel.

In step S412 the analyser logic 304 selects either the channel decorrelating mode or the non-channel decorrelating mode in dependence on a result of the comparison. For example, the channel decorrelating mode may be selected if the determined number of bits for the non-channel decorrelating mode, $n_{non-decorrelated}$, is greater than the determined number of bits for the channel decorrelating mode, $n_{decorrelated}$; whereas the non-channel decorrelating mode may be selected if the determined number of bits for the non-channel decorrelating mode, $n_{non-decorrelated}$, is less than the determined number of bits for the channel decorrelating mode, $n_{decorrelated}$. In some examples, the non-channel decorrelating mode may be selected if the determined number of bits for the non-channel decorrelating mode, $n_{non-decorrelated}$, is equal to the determined number of bits for the channel decorrelating mode, $n_{decorrelated}$. This may be considered beneficial because in the channel decorrelating mode any errors in the data values of the reference channel will propagate into multiple channels, whereas this is not the case in the non-channel decorrelating mode. However, in some alternative examples, the channel decorrelating mode may be selected if the determined number of bits for the non-channel decorrelating mode, $n_{non-decorrelated}$, is equal to the determined number of bits for the channel decorrelating mode, $n_{decorrelated}$.

The minimum of the (non-decorrelated) data values ($d_{min}$) for the non-reference channel in question may be anywhere in the range from 0 to $2^m-1$ (e.g. in the range from 0 to 255 where m=8), and can thus be represented with m bits. The minimum of the decorrelated data values ($d'_{min}$) for the non-reference channel in question may be anywhere in the range $-(2^m-1)$ to $2^m-1$ (e.g. in the range from −255 to 255 where m=8), and can thus be represented with (m+1) bits. In examples described below, a minimum value (referred to as an "origin value" below) is stored in the compressed data using m bits. As such, in some examples, the channel decorrelating mode is not selected if the minimum of the decorrelated data values ($d'_{min}$) for the non-reference channel in question cannot be represented with just m bits, i.e. the channel decorrelating mode is not selected if the minimum of the decorrelated data values ($d'_{min}$) for the non-reference channel in question is outside of a range from $-(2^{m-1})$ to $2^{m-1}-1$ (e.g. outside of a range from −128 to 127 where m=8). To put this another way, the selection of either the channel decorrelating mode or the non-channel decorrelating mode in step S412 may depend on whether a minimum of the decorrelated data values for the non-reference channel ($d'_{min}$) is within an inclusive range from $$-\frac{x_{max}+1}{2} \text{ to } \frac{x_{max}-1}{2},$$

where $x_{max}$ is the maximum value that a (non-decorrelated) data value can have, i.e. $x_{max}=2^m-1$. In particular, the non-channel decorrelating mode may be selected if: (i) the determined number of bits for the non-channel decorrelating mode, $n_{non-decorrelated}$, is less than the determined number of bits for the channel decorrelating mode, $n_{decorrelated}$, or (ii) the minimum of the decorrelated data values for the non-reference channel ($d'_{min}$) is not within the inclusive range from $$-\frac{x_{max}+1}{2} \text{ to } \frac{x_{max}-1}{2};$$

whilst the channel decorrelating mode may be selected if: (i) the determined number of bits for the non-channel decorrelating mode, $n_{non-decorrelated}$, is greater than the determined number of bits for the channel decorrelating mode, $n_{decorrelated}$, and (ii) the minimum of the decorrelated data values for the non-reference channel ($d'_{min}$) is within the inclusive range from $$-\frac{x_{max}+1}{2} \text{ to } \frac{x_{max}-1}{2}.$$

If the channel decorrelating mode is selected in step S412 then the decorrelated data values for the non-reference channel for the block are used in place of the data values of the non-reference channel for the block for determining compressed channel data for the non-reference channel (in step S414). For example, where the Green channel is the reference channel and the channel decorrelating mode is selected in step S412 for the Red channel then the data values for the Red channel (R) are replaced by the decor-related data values R' (e.g. where R'=R–G) for the purposes of determining compressed channel data for the Red channel, as described in more detail below. As another example, where the Green channel is the reference channel and the channel decorrelating mode is selected in step S412 for the Blue channel then the data values for the Blue channel (B) are replaced by the decorrelated data values B' (e.g. where B'=B–G) for the purposes of determining compressed channel data for the Blue channel, as described in more detail below. As another example in which there is also an Alpha channel, where the Green channel is the reference channel and the channel decorrelating mode is selected in step S412 for the Alpha channel then the data values for the Alpha channel (A) are replaced by the decorrelated data values A' (e.g. where A'=A–G) for the purposes of determining compressed channel data for the Alpha channel, as described in more detail below. Where there are a plurality of non-reference channels, different compression modes may be selected for different non-reference channels, e.g. the channel decorrelating mode may be selected for a first of the plurality of non-reference channels and the non-channel decorrelating mode may be selected for a second of the plurality of non-reference channels.

In step S414 the compression logic 305 determines compressed channel data for each of the channels for the block. The compression scheme used by the compression logic 305 to compress the data values for each of the channels of the block may be different in different examples. One such example, which uses an origin+delta value scheme, is described in detail below with reference to FIGS. 5, 6a and 6b.

In step S416 the compression logic 305 forms compressed data comprising: (i) an indication of the selected mode for each of the one or more non-reference channels, and (ii) the determined compressed channel data for each of the channels.

The compressed data is output from the compression unit 302, and may for example be passed to the memory 104 via the memory interface 108. The compressed data can then be stored in the memory 104. Alternatively, the compressed data may be stored in a memory other than the memory 104, e.g. the compressed data may be stored in a local memory on the GPU 102.

FIG. 5 is a flow chart showing how steps S414 and S416 can be implemented by the compression logic 305 in an example. In this example, a block of image data can be compressed to satisfy a target level of compression. As described above, the block of image data comprises a plurality of image element values, each image element value comprising a plurality of data values relating to a respective plurality of channels, wherein if the channel decorrelated mode has been selected for a particular non-reference channel then the decorrelated data values are used in place of the data values for that non-reference channel in steps S414 and S416 (and may just be referred to as "data values" in the following description of steps S414 and S416). The data values within a block for a channel can be represented using an origin value and a difference value, wherein the origin value is common to all of the data values within the block for the channel, whereas the difference values are specific to each of the data values. The difference values for the data values within the block for a channel can each be represented with a first number of bits. This first number of bits is chosen such that the maximum difference value for the channel for the block can be represented losslessly using said first number of bits without any leading zeros. An indication of the selected compression mode for each of the one or more non-reference channels for the block, and indications of the origin value and the first number of bits for each of the channels for the block are included in a header portion of a compressed block of data. The header portion of the compressed block of data has a fixed size. Representations of the difference values are included in a body portion of the compressed block of data. The body portion of the compressed block of data does not have a fixed size (i.e. the size of the body portion of the compressed block of data is dependent upon the actual data being compressed), but the body portion of the compressed block of data does have a maximum size that will not be exceeded by the representations of the difference values stored in the body portion of the compressed block of data. The maximum size of the body portion may depend upon the target level of compression. If lossless compression is being implemented then, for each of the channels, the representations of the difference values for that channel each have the first number of bits determined for that channel. However, in examples described in detail below in which lossy compression is implemented, for each of the channels, a second number of bits is determined based on the first numbers of bits for all of the channels. For each of the channels, each of the representations of the difference values for the channel is stored in the compressed block of data using the second number of bits for the channel. If using the first numbers of bits for the representations of the difference values in the compressed block of data will satisfy the target level of compression for compressing the block of image data, then the first numbers of bits are used for the representations of the difference values in the compressed block of data, i.e. for each of the channels, the second number of bits is determined to be equal to the first number of bits for the channel. However, if using the first numbers of bits for the representations of the difference values in the compressed block of data will not satisfy the target level of compression for compressing the block of image data, then the second number of bits for at least one of the channels is determined to be less than the first number of bits for that channel, to thereby ensure that storing the representations of the difference values in the compressed block of data using the second numbers of bits will satisfy the target level of compression.

In step S504, the analyser logic 304 determines, for each of the channels, an origin value for the channel for the block of image data. For example, the origin value for a channel may be determined by identifying a minimum of the data values relating to the channel for the block.

In step S506 the analyser logic 304 determines, for each of the channels, a maximum difference value for the block. Difference values (which may also be referred to as "delta values") for a channel for the block represent the differences between the data values and the determined origin value for the channel for the block. The maximum difference value for a channel for the block can be determined by identifying the minimum and the maximum data value relating to the channel for the block and then subtracting the identified minimum data value from the identified maximum data value.

In step S508 the analyser logic 304 determines, for each of the channels, a first number of bits. The determined first number of bits for a channel is a number. In particular, the determined first number of bits for a channel is a number of bits for losslessly representing the maximum difference value for the channel. In examples described herein, the determined first number of bits for a channel is the minimum number of bits which can be used to losslessly represent the determined maximum difference value for the channel. The first number of bits for each of the channels is determined by determining how many bits would be used to represent the maximum difference value obtained for the channel for the block without any leading zeros, wherein the determined number of bits is the first number of bits. It is noted that the first number of bits for a channel for a block is relevant for all of the data values relating to that channel for the block, rather than different data values relating to the channel within the block having different first numbers of bits determined for them. In some examples, step S508 might be performed for the reference channel but not for the non-reference channel(s) because for each of the non-reference channel(s) the first number of bits will be equal either to $n_{non-decorrelated}$ determined in step S404 or to $n_{decorrelated}$ determined in step S408, so there may be no need to determine the first number of bits again for the non-reference channels. In particular, the first number of bits for a non-reference channel will be equal to $n_{non-decorrelated}$ if the non-channel decorrelating mode was selected in step S412, and the first number of bits for a non-reference channel will be equal to $n_{decorrelated}$ if the channel decorrelating mode was selected in step S412.

The determined first number of bits for each of the one or more channels is passed to the difference value size determination logic 308. In step S510, the difference value size determination logic 308 uses (e.g. analyses) the determined first number of bits for each of the channels to determine a respective second number of bits for each of the channels. The second numbers of bits are determined such that (e.g. to ensure that) representing each of the difference values for the channels with the respective second number of bits satisfies the target level of compression for compressing the block of image data. The second number of bits is a number. In examples described herein, each of the second numbers of bits for the respective channels for the block is determined in dependence upon all of the first numbers of bits for the respective channels for the block. It is noted that the second number of bits for a channel for a block is relevant for all of the data values relating to that channel for the block, rather than different data values relating to the channel within the block having different second numbers of bits determined for them.

Step S510 may comprise the difference value size determination logic 308 determining whether representing the difference values for the channels with the respective determined one or more first number of bits would satisfy the target level of compression. If it is determined that representing the difference values for the channels with the respective determined first number of bits would satisfy the target level of compression then, for each of the channels, the second number of bits equals the first number of bits for that channel. In other words, if lossless compression of the image element values in the block will satisfy the target level of compression then the image element values are compressed losslessly. However, if it is determined that representing the difference values for the channels with the respective determined first number of bits would not satisfy the target level of compression then, for at least one of the channels, the second number of bits is less than the first number of bits for that channel. In other words, if lossless compression of the image element values in the block will not satisfy the target level of compression then the data values for at least one of the channels are compressed in a lossy manner to ensure that the target level of compression is satisfied. For example, the amount of loss introduced into the data values of the image element values being compressed may be no more than is necessary in order to satisfy the target level of compression.

In examples described herein, the second numbers of bits for the channels are determined using said determined first numbers of bits for the channels in accordance with a predetermined scheme. Determining the second numbers of bits from first numbers of bits in accordance with the predetermined scheme means that the second numbers of bits are determined in a deterministic manner. In these examples, the same predetermined scheme is used by the compression unit 302 and the decompression unit 702 (as described in more detail below with reference to FIGS. 7, 8 and 9). Since the same predetermined scheme for determining the second numbers of bits using the first numbers of bits is used in both the compression unit 302 and the decompression unit 702, indications of the second numbers of bits do not need to be included in the compressed data. It is noted that the compression unit 302 and the decompression unit 702 both use the same target compression rate. As described below, indications of the first numbers of bits are included in the compressed data, so the decompression unit 702 can use the first numbers of bits and the predetermined scheme to determine the same second numbers of bits as are determined in the compression unit 302. The predetermined scheme may be referred to as a predetermined technique or a predetermined algorithm.

In step S512 the difference value determination logic 306 determines, for each of the channels, difference values representing differences between the data values and the determined origin value for the channel for the block. For example, if the origin value is the minimum of the data values for the channel in the block, then the difference values can be determined by subtracting the origin value from the data values for the channel in the block.

In the example shown in FIG. 5, the difference values are determined after the first and second numbers of bits have been determined. In some other examples, the difference values may be determined before the first and second numbers of bits are determined. In particular, in these other examples, the determined difference values may be used in order to determine the first number of bits, e.g. by identifying the maximum difference value.

The compressed data formation logic 310 receives, for each of the channels, the origin value, the first number of bits, the second number of bits and the difference values. The compressed data formation logic 310 also receives, for each of the one or more non-reference channels, an indication of the selected compression mode (i.e. an indication of either the channel decorrelating mode or the non-channel decorrelating mode). In step S514 the compressed data formation logic 310 forms compressed data, e.g. as a compressed block of data, wherein the compressed data comprises:

an indication of the selected compression mode for each of the non-reference channels;
  an indication of the determined origin value for each of the channels;
  an indication of the determined first number of bits for each of the channels; and for each of the channels, representations of the determined difference values, wherein each of the representations of the determined difference values for the channel uses the determined second number of bits for the channel, such that the target level of compression is satisfied.

The example of step S514 described above implements a lossy compression scheme wherein the representations of the determined difference values for each of the channels have the second number of bits determined for that channel. However, in other examples which implement lossless compression schemes, the representations of the determined difference values for each of the channels may have the first number of bits determined for that channel (and step S510 might not be performed in these lossless examples).

The target level of compression corresponds to a target compressed block size. For blocks of image data which have a fixed size then the target level of compression for compressing the blocks of image data means that the compressed blocks of data do not exceed the target compressed block size. If the compression of a block of image data "satisfies the target level of compression" this means that the resulting compressed block of data does not exceed the target compressed block size. The compressed block of data may be smaller than the target compressed block size, e.g. if lossless compression of a block of image data results in a compressed block which is smaller than the target compressed block size. In this sense the target compressed block size represents a maximum size for the compressed block. The compression unit 302 may have a set of fixed target levels of compression. For example, a predetermined set of target levels of compression may comprise:

(i) a lossless level of compression in which all of the image element values are losslessly compressed even if this does not result in any reduction in the size of the data (this can be considered to be equivalent to a target compression ratio of 1:1, which may be referred to in terms of the target compressed block size being 100% of the size of the uncompressed block of image data), such that with the lossless level of compression the space reserved in memory (which may be referred to as the 'memory footprint') stays the same but the amount of data transmitted to and from memory (which may be referred to as the 'memory bandwidth') can be reduced;

(ii) a 75% level of compression in which the target compressed block size is 75% of the size of the uncompressed block of image data. This corresponds to a compression ratio of 4:3;

(iii) a 50% level of compression in which the target compressed block size is 50% of the size of the uncompressed block of image data. This corresponds to a compression ratio of 2:1;

(iv) a 37.5% level of compression in which the target compressed block size is 37.5% of the size of the uncompressed block of image data. This corresponds to a compression ratio of 8:3; and (iv) a 25% level of compression in which the target compressed block size is 25% of the size of the uncompressed block of image data. This corresponds to a compression ratio of 4:1.

In examples described herein, the target levels of compression refer to the amount of data used to store the difference values. The size of the data used to store the indications of the origin values and the indications of the first numbers of bits is fixed and does not depend on the target level of compression used by the compression unit 102, and is not included in determining the compression ratios "1:1", "4:3", "2:1", "8:3" and "4:1" in the examples listed above.

If the compression unit is implemented in dedicated hardware (e.g. as fixed function circuitry) the compression unit 302 may be configured in hardware to be able to perform compression according to any of the target levels of compression in the set of target levels of compression. A selection can be made of one of the target levels of compression from the set of target levels of compression for use by the compression unit 302 when compressing a block of image data. For example, the target level of compression implemented by the compression unit 302 may be configured before runtime, e.g. by firmware instructions which are executed when the GPU is initialised. In this way, the compression unit 302 will compress all of the blocks of image data according to the same target level of compression unless the configuration of the compression unit 302 is subsequently altered. Alternatively, when a block of image data is provided to the compression unit 302 to be compressed, an indication can be provided with the block of image data to the compression unit 302 to indicate what the target level of compression is for compressing the block of image data. This would allow the compression unit 302 to compress different blocks of image data according to different target levels of compression without needing to be reconfigured, but it would add a little extra complexity into the system due to the indications of the target level of compression which would be sent with the blocks of image data to the compression unit 302. During decompression a driver for the GPU sends an indication of the target level of compression to the decompression unit. This can be relatively simple if the target level of compression does not change during runtime for different blocks of image data. However, if the target level of compression can change during runtime for different blocks of image data then the driver could keep track of the target levels of compression for the different compressed blocks of data and indicate these target levels of compression to the decompression unit so that the decompression unit can correctly decompress the compressed blocks of data in accordance with their target levels of compression. In some other examples, indications of the target levels of compression for the blocks could be included in the header portions of the compressed blocks of data, such that when decompressing a compressed block of data, the decompression unit can read the indication of the target level of compression from the header portion of the compressed block of data to thereby determine the target level of compression for the block, rather than the driver tracking the target levels of compression.

In different examples, in step S510, the second numbers of bits can be determined differently based on the first numbers of bits. For example, in order to determine the second numbers of bits, the first numbers of bits can be reduced by zero, one or more, such that representing each of the difference values for the channels with said respective second numbers of bits by removing zero, one or more least significant bits (LSBs) from representations of the difference values having the determined first numbers of bits satisfies the target level of compression for compressing the block of image data. The amounts by which the first numbers of bits are reduced to thereby determine the second numbers of bits can be defined by the predetermined scheme. If the first number of bits for a channel is reduced by zero this means that the second number of bits for the channel will be equal to the first number of bits for the channel. Similarly, if zero LSBs are removed from a representation of a difference value having a first number of bits, this will not change the representation of the difference value. The LSBs are removed (rather than removing other bits) from the representations of the difference values because these are the bits that are least significant in terms of representing the values of the difference values, such that removing the LSBs will lose less information than if other bits were removed from the difference values. In this way, although some loss of information is introduced into the compression process by removing LSBs from the difference values, the loss of information is small, and for example, is only to an extent for guaranteeing that the target level of compression is satisfied.

The preceding paragraph gives one approach (which may be referred to as truncation) for mapping the representations of the difference values from a first number of bits (N) to a second number of bits (M), where M<N, but other approaches may be used in other examples. In some of these other approaches the average error may be less when decompressing the representations of the difference values back up from M bits to N bits. For example, in one other approach, there may be a precalculated lookup table, which includes mappings from N-bit patterns of bits to the M-bit patterns of bits that would reduce the errors when the M-bit representations are decompressed back to N-bit representations. For example, the mappings in the lookup table may be determined by performing an exhaustive search for the "best" M-bit pattern for every N-bit pattern for a given decompression scheme (e.g. bit replication), and storing these mappings in the lookup table. Here the "best" M-bit pattern for an N-bit pattern is the M-bit pattern that when decompressed back into N bits (according to the decompression scheme being used in the system) has the smallest error relative to the original N-bit pattern. In this 'lookup table' approach, the first numbers of bits are reduced by zero, one or more to thereby determine the second numbers of bits such that representing each of the difference values for the channels with the respective second numbers of bits by mapping the representations of the difference values having the first numbers of bits to representations of the difference values having the second numbers of bits in accordance with the predetermined lookup table satisfies the target level of compression for compressing the block of image data.

As another approach, for each of the difference values, the truncation approach could be used to map a representation of the difference value from the first number of bits (N) to the second number of bits (M) to determine a first candidate mapping. A second candidate mapping is determined to be 1 larger than the first candidate mapping. A third candidate mapping is determined to be 1 smaller than the first candidate mapping. Each of the three candidate mappings can be re-expanded to an N-bit representation, and the three re-expanded representations are compared to the original N-bit representation of the difference value. The candidate mapping that results in the closest re-expanded representation to the original N-bit representation of the difference value is selected to be used as the representation of the difference value having the second number of bits (M).

The predetermined scheme may aim to reduce each of the channels evenly, e.g. by the same or a similar amount. For example, in the truncation method described above, according to the predetermined scheme, least significant bits may be dropped sequentially from the individual channels until the target level of compression is met. In other words, one bit is removed from each of the channels in turn, until the total number of bits meets the target level of compression. The order in which LSBs are dropped from the different channels is defined by the predetermined scheme. The reference channel may be prioritised over the non-reference channels, e.g. by setting the order in which LSBs are dropped from the different channels so that the reference channel is the last channel from which LSBs are dropped.

In examples described above, the analyser logic 304 obtains the maximum difference value for a channel for a block in step S406 by identifying the minimum and maximum data values relating to the channel for the block and subtracting the identified minimum data value from the identified maximum data value. However, in other examples, the maximum difference value for a channel for a block could be determined by determining all of the difference values for the channel for the block and then identifying the maximum of those determined difference values. In these other examples, analyser logic may obtain the maximum difference value for a channel for the block by receiving the determined difference values for the channel for the block, and determining which of the determined difference values is the largest.

It is noted that if all of the data values for a channel in a block have the same value then no difference values are stored for that channel in the compressed block of data. In this case the first number of bits for the channel and the second number of bits for the channel are both zero, and the origin value for the channel stored in the header indicates the single value that each of the data values have for the channel in the block.

As described above, in some examples, the origin value for a channel for the block is determined by identifying a minimum of the data values relating to the channel for the block, and the maximum difference value of the difference values for the channel for the block is determined by identifying a maximum of the data values relating to the channel for the block and subtracting the identified minimum of the data values relating to the channel for the block from the identified maximum of the data values relating to the channel for the block. In these examples, the difference values for a channel are determined by subtracting the origin value for the channel form the data values relating to the channel. In these examples, the origin value for a channel represents a floor (i.e. a minimum value) for the data values relating to the channel for the block, and the difference values for the channel represent additions to be made to the origin value for the channel when decompressing the compressed block of data.

However, in other examples, the origin value for the channel for the block is determined by identifying a maximum of the data values relating to the channel for the block, and the maximum difference value of the difference values for the channel for the block is determined by identifying a minimum of the data values relating to the channel for the block and subtracting the identified minimum of the data values relating to the channel for the block from the identified maximum of the data values relating to the channel for the block. In these examples, the difference values for a channel are determined by subtracting the data values relating to the channel from the origin value for the channel. In these examples, the origin value for a channel represents a ceiling (i.e. a maximum value) for the data values relating to the channel for the block, and the difference values for the channel represent subtractions to be made from the origin value for the channel when decompressing the compressed block of data.

In some examples, it may be possible to set the origin value for a channel within the range of data values for the channel for the block (e.g. at a value in the middle of the range of data values for the channel for the block, e.g. at a value half way between the maximum and the minimum data value relating to the channel for the block), wherein the difference values can be signed values.

In some examples, it may be beneficial to clamp incoming data values to a slightly reduced range so that fewer bits can be used for the representations of the difference values. For example, if the minimum data value for a channel for a block is 20 and the maximum data value for the channel for the block is 54 then the maximum difference value for the channel for the block is 34. Since 34 is just above 32 (where it is noted that 25=32) it is marginally too big to represent with 5 bits and so 6 bits are used (i.e. the first number of bits for the channel for the block is 6). However, almost half of the possible encodings (i.e. from 35 to 63) are unused. If the incoming data values are clamped to a reduced range, e.g. 21 to 52 (i.e. so the minimum data value is 21 and the maximum data value is 52) then the maximum difference value for the channel for the block would be 31 which can be represented with 5 bits (i.e. the first number of bits for the channel for the block is 6), so the compression ratio can be improved, with very little additional error caused by the clamping.

In some examples, the origin value and the difference values for each of the channels for the block may be determined in accordance with modular arithmetic. In these examples, the origin value for each of the channels can be determined to be one of the data values of the block relating to the channel which results in the smallest maximum difference value when the difference values are determined relative to the origin value in accordance with the modulus of the modular arithmetic. For example, the difference values may be determined modulo 2m, where m is the number of bits in each of the data values. For example, if the data values are 8-bit values then the difference values may be determined modulo 256. For example, if the data values relating to a channel for the block are 8-bit values representing values of 251, 255, 7 and 16 in decimal (i.e. in binary the data values are 11111011, 11111111, 00000111 and 00010000), the origin value could be determined to be 251 (which can be considered to represent a value of −5 when the values are represented modulo-256). Taking 251 to be the origin value for these four data values, the difference values can be determined to be 0, 4, 12 and 21, such that the first number of bits determined for these difference values is five, i.e. the maximum difference value (21) can be represented losslessly with five bits (as 10101). It is noted that if modular arithmetic was not used to compress this block of four data values, then the difference values would each need to have eight bits, e.g. if the origin value was determined to be the minimum value in the block (i.e. 7), then the maximum difference value would be 248, which needs eight bits to be represented losslessly (as 11111000).

In the examples described above, a single origin value is determined for each of the channels for the block. In some other examples, a plurality of origin values may be determined for at least one of the channels. In these other examples, each of the difference values for the at least one of the channels (for which there are multiple origin values) is determined with respect to one of the plurality of origin values, and an indication for each of the difference values is included in the compressed block to indicate which of the plurality of origin values the difference value has been determined from. This can be useful if the data values relating to a channel within the block form multiple groups of data values, with each group of data values having a small range. This situation can occur relatively frequently, e.g. if the image element values within the block of image data relate to multiple different objects in a scene. For example, if the data values relating to a channel for the block were 3, 5, 3, 4, 6, 132, 132, 133 then a first origin value could be determined as 3 and a second origin value could be determined as 132, and then the difference values for the first five data values can be determined with respect to the first origin value as 0, 2, 0, 1 and 3, and the difference values for the last three data values can be determined with respect to the second origin value as 0, 0 and 1. In this case, the first number of bits determined for these difference values is two, i.e. the maximum difference value (3) can be represented losslessly with two bits (as 11). It is noted that if a single origin value was used to compress this block of data values, then the difference values would each need to have eight bits, e.g. if the origin value was determined to be the minimum value (i.e. 3), then the maximum difference value would be 130, which needs eight bits to be represented losslessly (as 10000010).

As mentioned above, in examples described herein, the compressed data is stored as a compressed block of data, e.g. the headers and difference values may be stored in the same contiguous block of compressed data. However, more generally, it is to be understood that the compressed data does not need to be stored as a block, e.g. as a contiguous block, of data. For example, the headers and the difference values may be stored separately, e.g. in separate sections of memory.

Figure 6A:
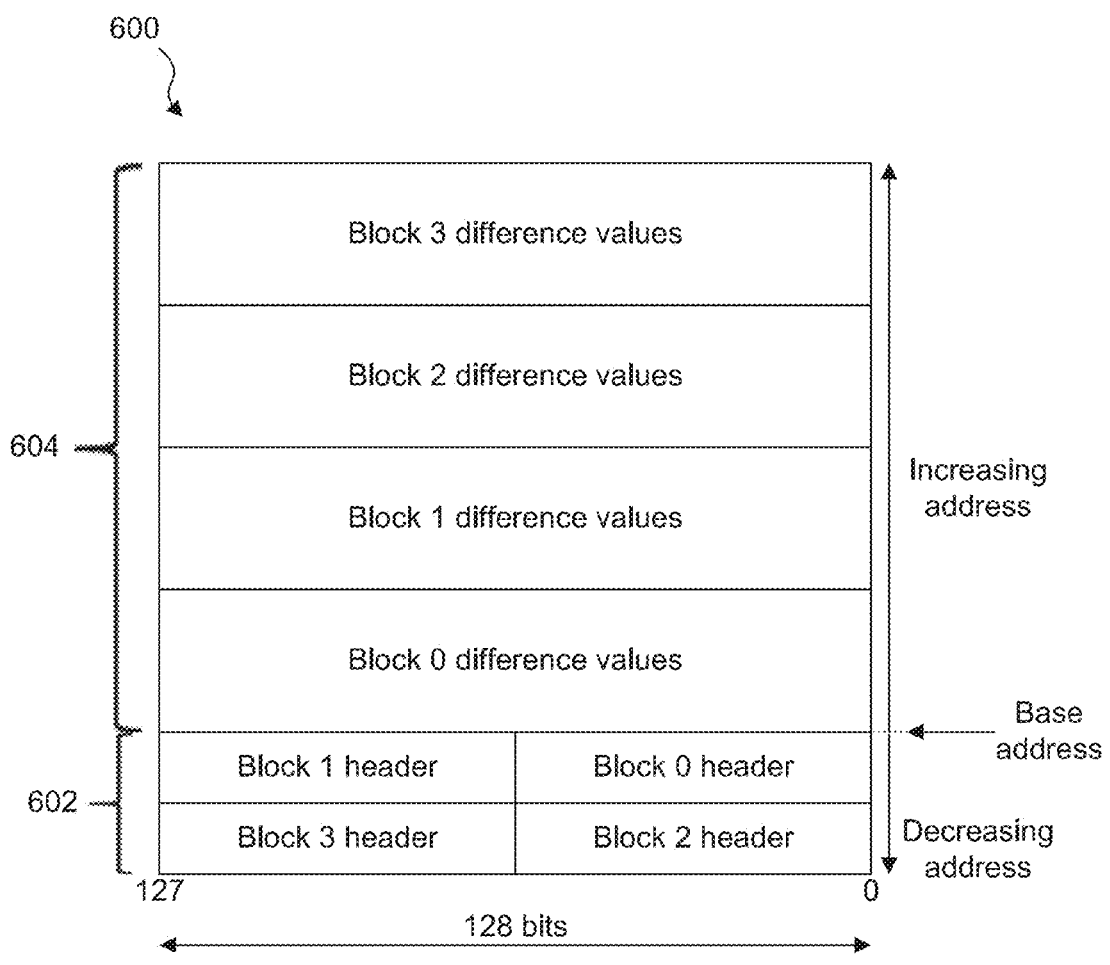
FIG. 6a illustrates an example format for storing four compressed blocks of data.
Figure 6B:
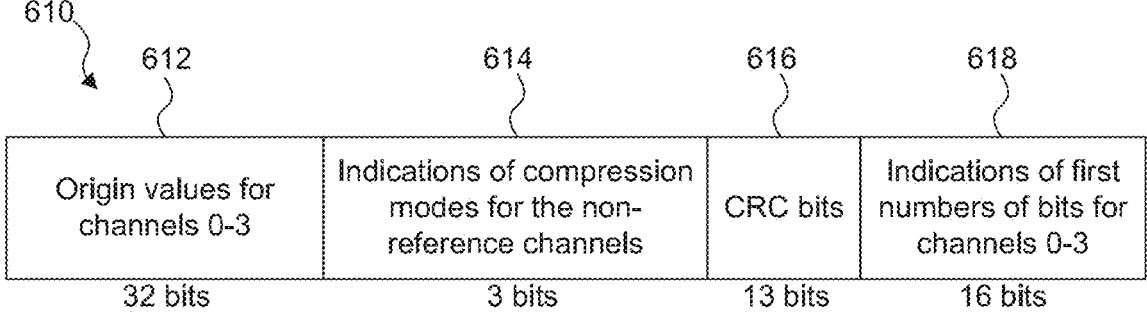
FIG. 6b illustrates an example format for the data within a header portion for a compressed block of data.

FIGS. 6a and 6b represent an example format for compressed blocks of data. In particular, FIG. 6a illustrates an example format 600 for storing four compressed blocks of data, denoted Block 0, Block 1, Block 2 and Block 3 in FIG. 6a. Each of the compressed blocks of data comprises a header portion (stored in section 602), which has a fixed size, and which comprises: the indication of the compression mode for each of the non-reference channels, the indication of the determined origin value for each of the channels, and the indication of the determined first number of bits for each of the channels for the block. Each of the compressed blocks of data also comprises a body portion (stored in section 604), which has a variable size, and which comprises the representations of the determined difference values for each of the channels. In the example shown in FIG. 6a, multiple (i.e. four) compressed blocks of data are stored together, such that the header portions of the compressed blocks are stored together in the section 602 and the body portions of the compressed blocks are stored together in the section 604. In other examples, each compressed block of data may be stored separately, i.e. in a distinct address space, such that the header portion and the body portion of each compressed block of data are stored in a contiguous range of addresses. In FIG. 6a, the body portions of the compressed blocks (stored in section 604) have sizes which are multiples of 128 bits. This is the case, in examples described herein, when an even number of bits per value (e.g. 4 bits per pixel) is targeted because the blocks of image data ($202_0$, $202_1$, $202_2$ and $202_3$) have 64 image element values, but if an odd number of bits per value were targeted (e.g. 5 bits per pixel) the body portions of the compressed blocks (stored in section 604) may have sizes which are multiples of 64 bits (and not necessarily multiples of 128 bits).

The four compressed blocks denoted in FIG. 6a may correspond with the respective four blocks of image data $202_0$, $202_1$, $202_2$ and $202_3$ shown in FIG. 2, such that each block of image data comprises 64 image element values. In this example, each image element value comprises four 8-bit data values relating to Red, Green, Blue and Alpha channels respectively, such that each image element value is represented with 32 bits. Therefore, each uncompressed block of image data is represented with 2048 bits. In the example shown in FIGS. 6a and 6b, a lossy compressed scheme has been used and the target level of compression is 50%. This means that, in this example, the maximum total number of bits that the difference values for each compressed block of data can be represented with is 1024 (i.e. sixteen bits per image element value, to be divided between the four channels). In the example shown in FIG. 6a, each of the header portions for a compressed block of data comprises 64 bits. In the example shown in FIG. 6a, each line of the address space represents 128 bits, so header portions for two compressed blocks can be on the same line, and each of the body portions for the different compressed blocks of data is provided with a maximum memory footprint corresponding to eight lines of the address space, i.e. 1024 bits (FIG. 6a is not drawn to scale). Because the compression technique described herein in this example is guaranteed to satisfy the target level of compression (e.g. 50% compression target), the body portion of a compressed block of data will not exceed the 1024 bits provided for it in the example shown in FIG. 6a. Each compressed block of data has a fixed storage allocation (i.e. a fixed memory footprint), which it will not exceed, and which is determined by the target level of compression.

As an example in which there are c channels (channel 0 to channel (c−1)), the difference values relating to d data values (data value 0 to data value (d−1)) are stored in the body portion of the compressed block of data in the order: data value 0, channel 0; data value 0, channel 1; . . . data value 0, channel (c−1); data value 1, channel 0; . . . data value 1, channel (c−1); . . . data value (d−1), channel 0; . . . data value (d−1), channel (c−1). In other words, the difference values relating to a particular data value are stored for each of the different channels, and then the difference values relating to the next data value are stored for each of the different channels, and so on. This allows the difference values relating to the data values for each of the different channels of a particular image element value to be read from the compressed block of data in one chunk. This can be useful if some but not all of the image element values in a compressed block of data are to be decompressed.

FIG. 6b illustrates an example format 610 for the data within a header portion for a compressed block of data. In this example, 64 bits of data is included in the header portion for a compressed block of data. The header portion comprises the indications of the origin values for the four channels 612. In this example, 32 bits are used for these indications of the origin values, such that 8 bits is used for each of the indications of an origin value for a channel. In this way, for each of the channels, the indication of the origin value for the channel has the same number of bits as one of the data values relating to the channel of one of the image element values in the block of image data. In this way, the precision of the origin value is not reduced, so no data is lost in the origin value, even when lossy compression is being implemented. If the channel decorrelating mode is selected for a non-reference channel then the origin value for the non-reference channel is indicated by the indication in the compressed data in a signed format. If the non-channel decorrelating mode is selected for a non-reference channel then the origin value for the non-reference channel is indicated by the indication in the compressed data in an unsigned format. For each of the non-reference channels, the indication of the determined origin value for the non-reference channel may be included in the compressed data as a number representing: (i) the determined origin value for the non-reference channel, or (ii) a difference between the determined origin value for the non-reference channel and the determined origin value for the reference channel for the block.

The header portion also comprises some bits 614 (e.g. three bits), which are used for the indications of the compression modes for the non-reference channels. For example a first of the three bits 614 may indicate either the channel decorrelating mode or the non-channel decorrelating mode for a first non-reference channel (e.g. the Red channel), a second of the three bits 614 may indicate either the channel decorrelating mode or the non-channel decorrelating mode for a second non-reference channel (e.g. the Blue channel), and a third of the three bits 614 may indicate either the channel decorrelating mode or the non-channel decorrelating mode for a third non-reference channel (e.g. the Alpha channel). FIG. 6b shows that the header portion also comprises some error correction indications 616, e.g. Cyclic Redundancy Check (CRC) bits, which are described below. In the example shown in FIG. 6b, 13 bits are used for the error correction indications. The error correction indications 616 are included for some uses cases (e.g. for safety critical cases), but for other use cases they might not be needed and might not be included in the header portion. The header portion also comprises an indication of the first number of bits for each of the channels 618. In this example, there are four channels, and each indication of the first number of bits has four bits such that there are sixteen bits used for the indications of the first numbers of bits. The use of four bits for an indication of a first number of bits, allows values from 0 to 15 to be represented by each of the first numbers of bits. Many of these encodings are not used for indicating a first number of bits, e.g. values from 9 to 15 are not used for indicating a first number of bits when all of the data values are 8-bit values, and these redundant encodings may be used for other purposes.

In examples described herein, the compressed block of data has a base address, and the header portion starts at a first address defined by the base address, with the data of the header portion running in a first direction from the first address, and wherein the body portion starts at a second address defined by the base address, with the data of the body portion running in a second direction from the second address, wherein the first direction is opposite to the second direction in address space. For example, if each compressed block of data was stored separately then the base address could point to the start of the body portion of the compressed block of data and the addresses of the body portion increase from that point, and the header portion can start from the base address minus 1 and the addresses of the header portion decrease from that point. The example shown in FIG. 6a is slightly more complicated because four compressed blocks of data are being stored together. However, even in this case, the starting addresses of the header portions for each of the different compressed blocks of data are defined by the base address, and the starting addresses of the body portions for each of the different compressed blocks of data are defined by the base address.

In the examples described above, the compressed block of data does not include an indication of the determined second number of bits for each of the channels. Instead, an indication of the first number of bits for each of the channels is included in the compressed block of data and the same predetermined scheme that was used to determine the second numbers of bits from the first numbers of bits can be used in the decompression unit 112 to determine the second numbers of bits as described in more detail below.

However, in other examples, the compressed block of data may further comprise (e.g. in the header portion of the compressed block of data), for each of the channels, an indication of said determined second number of bits for the channel. For example, the header portion of the compressed block of data might not include the error correction indications 616, in which case those bits could be used to store indications of the second numbers of bits for the respective channels.

As mentioned above, in some examples, one or more error correction indications may be included in the compressed block of data. These error correction indications can be determined by the compression unit 302 by determining image element values that would be obtained by correctly decompressing the compressed block of data. The error correction indications can be CRC bits which can be calculated in a known manner. If the difference values are being losslessly represented in the compressed block of data, e.g. if the first number of bits equals the second number of bits for each of the one or more channels, then the CRC bits can be calculated from the original data values of the block of image data, since these are the values that should be obtained by correctly decompressing the compressed block of data. However, if any of the difference values are being represented lossily in the compressed block of data, e.g. if the first number of bits does not equal the second number of bits for any of the channels, then the compression unit 302 can determine the data values that the decompression unit 602 should obtain by correctly decompressing the compressed block of data, and then the CRC bits can be calculated from the data values determined by the compression unit 302. The compression unit may, for example, determine the data values that the decompression unit should obtain by analysis of the block of input data and the various determinations made during the compression process. Alternatively, the compression unit may decompress the compressed block of data to determine the data values that the decompression unit should obtain. In this way, error correction techniques can be used even when lossy compression is being performed to determine whether there are any errors in the transmission of the data representing the compressed block of data, e.g. in the transmission from the compression unit 110 to the memory 104 via the memory interface 108, and back from the memory 104 to the decompression unit 112 via the memory interface 108.

As mentioned in the preceding paragraph, the compression unit 302 may determine the data values that the decompression unit should obtain when it decompresses the compressed data. If lossy compression has been implemented then the decompressed data values for reference channel might not exactly match the original data values in the reference channel prior to compression (which may be referred to as the "uncompressed" data values). When the channel decorrelating mode is selected then the data values for the non-reference channels will be determined using the decompressed data values (rather than the uncompressed data values) for the reference channel. However, in the examples described above the decorrelated data values for the non-reference channels are determined in the compression unit 302 based on the uncompressed data values (rather than the decompressed data values) for the reference channel. Therefore, in some examples, after the data values have been compressed as described above, the compression unit 302 may re-determine the decorrelated data values for the non-reference channels based on the decompressed data values (rather than the uncompressed data values) for the reference channel, and then compress these re-determined decorrelated data values for the non-reference channels as described above. This should reduce the extent to which errors introduced into the data values of the reference channel by the lossy compression are propagated into the data values of the non-reference channels. To put it more explicitly, if the channel decorrelating mode is selected then the compression unit 302 may determine decompressed data values for the reference channel using the indication of the origin value and the representations of the determined difference values for the reference channel, and then for each of the one or more non-reference channels the compression unit 302 may: (i) determine new decorrelated data values for the non-reference channel by finding, for each image element value in the block, a difference between the data value of the non-reference channel and the decompressed data value of the reference channel; and (ii) use the new decorrelated data values in place of the data values of the non-reference channel for the block for determining compressed channel data for the non-reference channel.

Example Compression

There is now described an example in which each image element value has data values relating to four colour channels: a Red channel (R), a Green channel (G), a Blue channel (B) and an Alpha channel (A). In this simplified example, a block of four pixel values is to be compressed. Each pixel value is represented with 32 bits in a R8G8B8A8 format (i.e. each data value is represented with 8 bits), so the uncompressed block of image data is represented with 128 bits. The target level of compression is 50%, so the body portion of the compressed block of data cannot exceed 64 bits. The Red, Green, Blue and Alpha values in the block can be represented as separate data sets. In this example, the values of the four pixels in the block in the different channels are:

R=[17, 24, 9, 45]
G=[89, 100, 84, 119]
B=[240, 228, 215, 198]
A=[255, 255, 250, 255]

The Green channel is the reference channel in this example, so the decorrelated data values are:

R'=R−G=[−72, −76, −75, −74]
G'=G=[89, 100, 84, 119]
B'=B−G=[151, 128, 131, 79]
A'=A−G=[166, 155, 166, 136]

The difference between the maximum and minimum of the Red data values is 36 (45−9=36), which can be represented in binary with 6 bits (as 100100), so $n_{non\text{-}decorrelated,red}=6$. The difference between the maximum and minimum of the decorrelated Red data values is 4 (−72+76=4), which can be represented in binary with 3 bits (as 100), so $n_{decorrelated,red}=3$. Since $n_{decorrelated,red} < n_{non\text{-}decorrelated,red}$, and the minimum value (−76) of the decorrelated data values for the red channel is within the range from −128 to +127, the channel decorrelating mode is selected for the Red channel and the decorrelated data values, R', are used in place of the (non-decorrelated) data values, R, for the compression.

The difference between the maximum and minimum of the Blue data values is 42 (240−198=42), which can be represented in binary with 6 bits (as 101010), so $n_{non\text{-}decorrelated,blue}=6$. The difference between the maximum and minimum of the decorrelated Blue data values is 3 (151−79=72), which can be represented in binary with 7 bits (as 1001000), so $n_{decorrelated,blue}=7$. Since $n_{decorrelated,blue} > n_{non\text{-}decorrelated,blue}$, the non-channel decorrelating mode is selected for the Blue channel and the (non-decorrelated) data values, B, are used for the compression.

The difference between the maximum and minimum of the Alpha data values is 5 (255−250=5), which can be represented in binary with 3 bits (as 101), so $n_{non-decorrelated,alpha}$=3. The difference between the maximum and minimum of the decorrelated Alpha data values is 30 (166−136=30), which can be represented in binary with 5 bits (as 11110), so $n_{decorrelated,alpha}$=5. Since $n_{decorrelated,alpha}>n_{non-decorrelated,alpha}$, the non-channel decorrelating mode is selected for the Alpha channel and the (non-decorrelated) data values, A, are used for the compression.

In this example, the origin values are determined as the minimum values in the block for each channel. Therefore, the origin values and difference values are:

R': origin=−76 (which in two's complement format is 10110100), difference values=[4, 0, 1, 2]. The lossless difference values for the Red channel can be represented in binary with 3 bits (i.e. the first number of bits for the Red channel is 3), i.e. they can be represented as: [100, 000, 001, 010].

G: origin=84, difference values=[5, 16, 0, 35]. The lossless difference values for the Green channel can be represented in binary with 6 bits (i.e. the first number of bits for the Green channel is 6), i.e. they can be represented as: [000101, 010000, 000000, 100011].

B: origin=198, difference values=[42, 30, 17, 0]. The lossless difference values for the Blue channel can be represented in binary with 6 bits (i.e. the first number of bits for the Blue channel is 6), i.e. they can be represented as: [101010, 011110, 010001, 000000].

A: origin=250, difference values=[5, 5, 0, 5]. The lossless difference values for the Alpha channel can be represented in binary with 3 bits (i.e. the first number of bits for the Alpha channel is 3), i.e. they can be represented as: [101, 101, 000, 101].

The 50% compression target allows 16 bits per pixel value for the difference values, but if all of the channels were compressed losslessly in this example, there would be 18 bits per pixel value for the difference values (i.e. 3+6+6+3=18). According to the predetermined scheme, we may choose to lose an LSB from the alpha and blue channels first, such that the second numbers of bits are determined for the channels to be R=3 bits, G=6 bits, B=5 bits, and A=2 bits. The indication of the origin value for each channel comprises 8 bits, the indication of the first number of bits for each channel comprises 4 bits, and the indication of the selected compression mode for each non-reference channel comprises 1 bit.

Therefore, in the compressed block we store the indications of the compression modes for each of the non-reference channels (where a '0' indicates the non-channel decorrelating mode and a '1' indicates the channel decorrelating mode), the indications of the origin values for each of the channels, the indications of the first numbers of bits for each of the channels and difference values for each of the channels, in binary, as:

R: origin value=10110100, compression mode indicator=1, first number of bits=0011, difference values: [100, 000, 001, 010]

G: origin value=01010100, first number of bits=0110, difference values: [000101, 010000, 000000, 100011]

B: origin value=11000110, compression mode indicator=0, first number of bits=0110, difference values: [10101, 01111, 01000, 00000]

A: origin value=11111010, compression mode indicator=0, first number of bits=0011, difference values: [10, 10, 00, 10]

It is noted that the use of the channel decorrelating mode for the Red channel in this example meant that the first number of bits for the Red channel is 3, whereas if the non-channel decorrelating mode was used for the Red channel then the first number of bits for the Red channel would have been 6. So if the channel decorrelating mode could not have been used for the Red channel in this example, the second numbers of bits for three of the four channels would have to have been reduced by one, which would have increased the errors introduced by the lossy compression technique. In the example given above, a simple truncation approach is used to reduce the difference values down to having the second numbers of bits, but in other examples other approaches may be used, e.g. the lookup table approach described above may be used instead of the truncation approach.

Decompression

Figure 7:
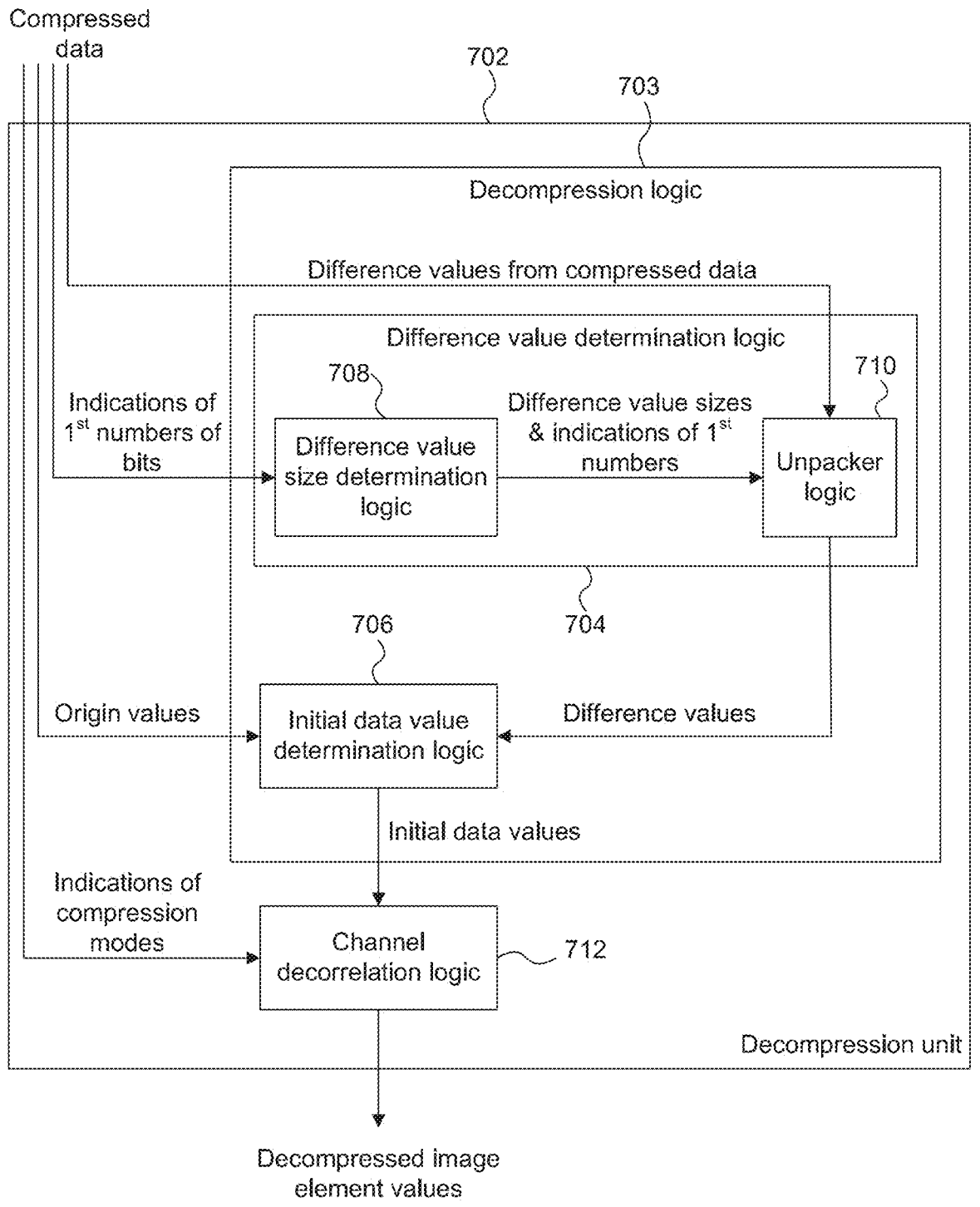
FIG. 7 shows a decompression unit.

An example of a decompression technique is now described with reference to FIGS. 7, 8 and 9. FIG. 7 shows a decompression unit 702 configured to perform decompression to determine one or more image elements values from compressed data (e.g. a compressed block of data). The decompression unit 702 may be implemented as the decompression unit 112 in the graphics processing system shown in FIG. 1. The decompression unit 702 comprises decompression logic 703. The decompression logic 703 comprises difference value determination logic 704 and initial data value determination logic 706. The difference value determination logic 704 comprises difference value size determination logic 708 and unpacker logic 710. The decompression unit 702 also comprises channel decorrelation logic 712. Each of the logic blocks 704 to 712 implemented in the decompression unit 702 may be implemented in hardware (e.g. dedicated hardware implemented with fixed-function circuitry), software (e.g. as a software module executing on a processor), or a combination thereof. Implementing the logic blocks in hardware would normally provide a lower latency of operation than implementing the logic blocks in software. However, implementing the logic blocks in software allows more flexibility in terms of altering the functionality of the logic blocks after manufacture of the decompression unit 702. So in some systems, a hardware implementation may be more suitable than a software implementation (e.g. when the compression needs to be performed quickly), whereas in some other systems, a software implementation may be more suitable than a hardware implementation (e.g. when the functionality of the decompression unit needs to be variable).

FIG. 8 shows a flow chart for a method of performing decompression to determine one or more image element values from a compressed block of data which has been compressed as described above. As described above, each image element value comprises a plurality of data values relating to a respective plurality of channels, wherein the plurality of channels comprises a reference channel and a plurality of non-reference channels. In this example, the compressed data is in a compressed block of data, but in other examples, the compressed data is not necessarily in a block of compressed data.

In step S802 the compressed block of data is received at the decompression unit 702. For example, if the decompression unit 702 is being implemented as the decompression unit 112 in the graphics processing system shown in FIG. 1, the compressed block of data may be received from the memory 104 via the memory interface 108.

In step S804 the decompression logic 703 reads, from the compressed data, compressed channel data for each of the channels. For example, the compressed channel data may have the format shown in FIGS. 6a and 6b and described above. In step S806, for each of the channels, the decompression logic 703 uses the compressed channel data for the channel to determine an initial data value relating to the channel for each of the one or more image element values being decompressed. For each of the one or more image element values being decompressed, the determined initial data value relating to the reference channel for the image element value is a decompressed data value for the reference channel. However, the determined initial data value relating to a non-reference channel for an image element value may or may not be a decompressed data value for the non-reference channel, depending on the compression mode for the non-reference channel. Details of how steps S804 and S806 can be performed in an example are described in detail below with reference to the flow chart of FIG. 9.

In steps S808 to S814, the channel decorrelation logic 712 determines, for each of the one or more image element values being decompressed, a decompressed data value for each of the non-reference channels. In particular, in step S808, for each of the non-reference channels, the channel decorrelation logic 712 reads, from the compressed data, an indication of a compression mode for the non-reference channel for the block. As described above, the compression mode is either a channel decorrelating mode or a non-channel decorrelating mode.

In step S810 the channel decorrelating logic 712 identifies the compression mode for a non-reference channel as either the channel decorrelating mode or the non-channel decorrelating mode. In one example if the indication of the compression mode is a '0' then it indicates the channel decorrelating mode, and if the indication of the compression mode is a '1' then it indicates the non-channel decorrelating mode; but in other examples a '1' may indicate the channel decorrelating mode and a '0' may indicate the non-channel decorrelating mode. If the compression mode for a non-reference channel is the channel decorrelating mode then the method passes to step S812, and if the compression mode for a non-reference channel is the non-channel decorrelating mode then the method passes to step S814.

In step S812 (which is performed for a non-reference channel if the compression mode for the non-reference channel is the channel decorrelating mode) the channel decorrelation logic 712, determines the decompressed data value for the non-reference channel to be a function (e.g. a sum) of the determined initial data value relating to the non-reference channel and the determined initial data value relating to the reference channel for the image element value. In the examples described in detail herein the function is a sum, but it is to be understood that in other examples other mathematical functions may be used. A sum is used when the compression decorrelation operation takes the difference of the non-reference and reference channels, and such is beneficial when there is (on average) strong positive correlation between the reference and non-reference channels, i.e. the covariance of the two channels is approximately 1.0. This is often the case in image data as signals are often dominated by changes in brightness wherein if one channel is increasing (or decreasing), there is a high probability that other channels are also increasing (or decreasing).

In other examples, alternative or additional 'decorrelation' schemes may be used or included to cope with other data behaviour. For example, in RGB or YUV image data, sometimes a block of pixels may demonstrate "anticorrelation" of channels, i.e., as the U channel increases, perhaps V decreases. Similarly, in RGB data, an image of, perhaps, a parrot with red and green feathers might show anticorrelation between the R&G channels. In these examples, where the covariance of the channels is approximately −1.0, rather than using the difference of reference and non-reference channel during compression, the sum of the channels could be used. As such, on decompression, the difference could be used.

In another example, the magnitude of the covariance between channels may be less than one. For example, if as Green changes by "X", the Blue channel changes by "X/2" then a decorrelation of $B_{Decorrelated}=B-\text{floor}(G/2)$ on compression, and the opposite on decompression. Additional analysis and flags may be included in the scheme to select the best decorrelation mode.

In step S814 (which is performed for a non-reference channel if the compression mode for the non-reference channel is the non-channel decorrelating mode) the channel decorrelation logic 712, determines the decompressed data value for a non-reference channel to be the determined initial data value relating to the non-reference channel for the image element value.

The determined decompressed data values represent the decompressed image element values. The method may further comprise outputting the determined decompressed data values of the one or more image element values being decompressed for further processing. For example, where the decompression unit 702 is implemented as the decompression unit 112 in the graphics processing system 100, then the determined decompressed data values may be output from the decompression unit 112 to the processing logic 106 of the GPU 102, e.g. to be processed by the processing logic 106.

As described above, different compression modes may be used for different non-reference channels, e.g. the compression mode for a first of the non-reference channels may be the channel decorrelating mode, and the compression mode for a second of the non-reference channels may be the non-channel decorrelating mode. Furthermore, as described above, the plurality of channels may comprise a Red channel, a Green channel, a Blue channel and in some examples an Alpha channel, and the Green channel may be the reference channel.

FIG. 9 is a flow chart showing how steps S804 and S806 can be implemented by the decompression logic 703 in an example. In this example, a block of image data can be decompressed, wherein the block of image data has been compressed to satisfy a target level of compression. In this example, the compressed data comprises, an indication of the compression mode for each of the non-reference channels, an indication of an origin value for each of the channels, an indication of a first number of bits for losslessly representing the difference values for each of the channels, and representations of the difference values for each of the channels. A second number of bits may be obtained for each of the channels, wherein the second number of bits is the number of bits with which the representations of the difference values are included in the compressed data. If the second number of bits is less than the first number of bits for a channel then one or more LSBs are added (i.e. appended) to the difference values from the compressed data to determine the difference values having the first number of bits. Then, for each channel, the initial data values relating to that channel can be determined by combining the origin value for that channel and the difference values for that channel which have the first number of bits for that channel.

The compressed data may be stored as a compressed block of data having the format described above, e.g. as shown in FIGS. 6a and 6b. As mentioned above, in examples described herein, the compressed data is stored as a compressed block of data, e.g. the headers and difference values may be stored in the same contiguous block of compressed data. However, more generally, it is to be understood that the compressed data does not need to be stored as a block, e.g. as a contiguous block, of data. For example, the headers and the difference values may be stored separately, e.g. in separate sections of memory. In the example format of the compressed block of data shown in FIGS. 6a and 6b, the header portion of the compressed block of data has a fixed size. Furthermore, the second numbers of bits can be determined based on information in the header portion without needing to read any data from the body portion of the compressed block of data. When the second numbers of bits have been determined then the position of each of the difference values can be determined. For example, the sum of second numbers of bits for the channels gives an overall compressed size of the difference values relating to the data values of one image element value, which can be used to determine the offset to the required difference values for the image element values being decompressed. Therefore, the difference values for some of the data values can be read without necessarily reading all of the difference values. This means that the decompression unit 112 can determine decompressed values for one or more of the image element values in the block of image data without necessarily decompressing the entire compressed block of data. For example, the block of image data may comprise 64 texel values, and a bilinear texture filtering operation might need to determine just four of the texel values from the compressed block of data. With the decompression technique described in examples herein, the decompression unit 112 can determine the four desired texel values without decompressing the other 60 texel values in the compressed block of data. In this way, the compressed block of data is "randomly accessible". Furthermore, it is even possible to decompress individual data values relating to individual channels from the compressed block of data without necessarily decompressing other data values from the compressed block of data (even data values relating to different channels for the same image element value).

In this example, step S804 comprises steps S902 to S908, and step S806 comprises steps S910 and S912. In step S902 the difference value size determination logic 708 reads the indication of the first number of bits from the compressed block of data for each of the channels. As described above, the first number of bits for a channel is a number of bits which can be used to losslessly represent the difference values for the channel for the block.

In step S904 the difference value size determination logic 708 obtains the difference value sizes of the difference values stored in the compressed block for each of the channels. In other words, in step S904 the difference value size determination logic 708 obtains (e.g. determines) a second number of bits for each of the channels, wherein representations of the difference values for each of the channels are included in the compressed block of data using the second number of bits for that channel. As described above, the second numbers of bits are determined to ensure that the compressed block of data satisfies a target level of compression for compressing the block of image data. The determined difference value sizes (i.e. the second numbers of bits) and the indications of the first numbers of bits for the channels are provided to the unpacker logic 710.

In examples described herein in which indications of the second numbers of bits are not included in the compressed block of data, step S904 involves using the first number of bits for each of the channels to determine the second number of bits for the channel in accordance with a predetermined scheme. In particular, the predetermined scheme is the same scheme as that used in the compression unit 302 described above, such that given the same set of first numbers of bits, the decompression unit 702 will determine the same set of second numbers of bits as were determined in the compression unit 302. In other words, a common function is used by both the compression unit 302 and the decompression unit 702 that determines how many LSBs are dropped from the difference values for each of the one or more channels.

In particular, similarly to as described above in relation to the compression process, step S904 may involve determining whether representing the difference values for the channels with the respective determined first number of bits would satisfy the target level of compression. If it is determined that representing the difference values for the channels with the respective determined first number of bits would satisfy the target level of compression then, for each of the channels, the second number of bits equals the first number of bits for that channel. However, if it is determined that representing the difference values for the channels with the respective determined first number of bits would not satisfy the target level of compression then, for at least one of the channels, the second number of bits is less than the first number of bits for that channel.

Furthermore, as described above, in some examples an indication of the second number of bits for each of the channels may be included in the compressed block of data. In these examples, the difference value size determination logic 708 does not need to be implemented in the decompression unit. In these examples, a second number of bits is obtained by the difference value determination logic 704, for each of the channels, by reading an indication of the second number of bits for the channel from the compressed block of data.

In step S906 the unpacker logic 710 uses the second numbers of bits for the respective channels to read the representations of the difference values for the one or more image element values being decompressed from the compressed block of data.

It is noted that in some other examples (not shown in FIG. 9), which implement lossless compression and decompression, the difference values for a channel might always be included in the compressed data using the first number of bits for that channel, such that the second numbers of bits do not need to be obtained, i.e. step S904 does not need to be performed.

In step S908 the initial data value determination logic 706 reads, from the compressed block of data, the indication of the origin value for each of the one or more channels. The indication of the origin value for the reference channel is read from the compressed data as a number representing the origin value for the reference channel. For each of the non-reference channels, the indication of the origin value for the non-reference channel is read from the compressed data as a number representing: (i) the origin value for the non-reference channel, or (ii) a difference between the origin value for the non-reference channel and the origin value for the reference channel for the block.

In step S910, based on the representations of the difference values read from the compressed block of data, the unpacker logic 710 determines, for each of the channels and for each of the one or more image element values being decompressed, a difference value in accordance with said first number of bits for the channel. For example, the determined difference values for a channel have the first number of bits indicated for that channel. The determined difference values with the appropriate first number of bits for the respective channel are provided to the initial data value determination logic 706.

In examples described herein, in step S910 determining, for each of the channels and for each of the one or more image element values being decompressed, a difference value in accordance with said first number of bits for the channel comprises adding (i.e. appending) zero, one or more least significant bits (LSBs) to the representations of the difference values read from the compressed block of data to thereby determine the difference values having said first number of bits for each of the channels. If the first number of bits is the same as the second number of bits for a channel then zero LSBs are added to the representations of the difference values read from the compressed block of data. If the first number of bits is greater than the second number of bits for a channel then one or more LSBs are added to the representations of the difference values read from the compressed block of data to determine difference values having the first number of bits for the channel.

The values of the bits that are added can be different in different examples. In a simple example, the zero, one or more LSBs which are added to the representations of the difference values read from the compressed block of data are all zeros. Using zeros for the LSBs that are added means that when adding the difference values to the origin values, the results are guaranteed not to overflow, such that a simpler (e.g. smaller in terms of silicon area) adder can be used for adding the difference values to the origin values, than if other values are used for the LSBs that are added back on. It is possible to get underflow when decorrelation is used, so to avoid underflow intermediate results that are less than zero may be clamped to zero. Furthermore, using zeros for the LSBs that are added means that a data value of zero that is compressed and then decompressed and will still be zero. This can be useful, e.g. for representing red, blue and green channel values such that a completely black region (e.g. which has red, green and blue values of zero) will remain completely black after compression and decompression of the image element value. This can also be useful for representing alpha channel values such that a completely transparent image element value (i.e. an image element value with an alpha value of zero) will remain completely transparent after compression and decompression of the image element value.

In another example, the zero, one or more LSBs which are added to the representations of the difference values read from the compressed block of data are all ones. Using ones for the LSBs that are added means that a maximum data value (e.g. a value of 255 for an 8-bit data value) that is compressed and then decompressed and will still be the maximum data value. This can be useful, e.g. for representing red, blue and green channel values such that a completely white region (e.g. which has maximum red, green and blue values (e.g. values of 255 for 8-bit values)) will remain completely white after compression and decompression of the image element value. This can also be useful for representing alpha channel values such that a completely opaque image element value (i.e. an image element value with a maximum alpha value (e.g. an alpha value of 255 for an 8-bit value)) will remain completely opaque after compression and decompression of the image element value. If ones are used for the LSBs that are added to the difference values, then precautions may be taken to ensure that the sums of the difference values and the origin values do not overflow. For example, a carry out bit may be used to indicate if there is a potential overflow (e.g. where the carry out bit is determined by performing logical OR operations on the bits being summed. If the carry out bit indicates that there is not a potential overflow then the method proceeds as described herein, but if the carry out bit indicates that there is a potential overflow for a sum then the result of the sum is clamped to the maximum value (e.g. 255 for 8 bit values).

In a further example, the zero, one or more LSBs which are added to the representations of the difference values read from the compressed block of data are random or pseudo-random bits. Using random or pseudo-random bits for the LSBs that are added may help to reduce visually perceptible banding effects being introduced into the image element values by the compression and decompression of the image element values.

In another example, the zero, one or more LSBs which are added to the representations of the difference values read from the compressed block of data are determined by bit replication of a corresponding zero, one or more MSBs of the representations of the difference values read from the compressed block of data. In this way if n LSBs are being added to the representations of the difference values then those n bits match the n MSBs of the representations of the difference values read from the compressed block of data. This is a simple approach to determining the LSBs to be added and does not add systematic bias into the decompressed values, although it does slightly push decompressed values away from the centre value.

In a yet further example, the zero, one or more LSBs which are added to the representations of the difference values read from the compressed block of data are different for different ranges of origin values or for different ranges of difference values. For example, for low origin values, e.g. for origin values below a threshold value, the zero, one or more LSBs which are added to the representations of the difference values are zeroes; whereas for high origin values, e.g. for origin values above the threshold value, the zero, one or more LSBs which are added to the representations of the difference values are ones. The threshold value could be any suitable value, e.g. anywhere between 1 and $(2^m-1)$ for m-bit origin values. This may help to preserve a true black colour (represented with zeros) and to preserve a true white colour (represented with ones). As another example, for difference values whose MSB is a zero, the zero, one or more LSBs which are added to the representations of the difference values are zeroes; whereas for difference values whose MSB is a one, the zero, one or more LSBs which are added to the representations of the difference values are ones.

The method may comprise performing a left shift operation on the bits of the representations of the difference values read from the compressed block of data by zero, one or more bit positions, and then adding the zero, one or more LSBs in the LSB position(s) after the shift, wherein the zero, one or more LSBs are determined as described above to thereby determine the difference values having said first number of bits for each of the one or more channels.

In step S912 the initial data value determination logic 706 determines, for each of the channels, the initial data value relating to the channel for each of the one or more image element values being decompressed using: (i) the origin value for the channel, and (ii) the determined difference value for the channel for the image element value. The way in which the initial data values are determined using the difference values and the origin value for a channel matches the way in which the difference values and origin values were determined in the compression unit 302 based on the data values. As described above, the compression unit 302 may determine the origin values and difference values using the data values differently in different examples. For example, if the origin values are the minimum data values within the block, then for each of the channels, the initial data value relating to the channel for each of the one or more image element values being decompressed is determined by summing the origin value for the channel and the determined difference value for the channel for the image element value. As another example, if the origin values are the maximum data values within the block, then for each of the channels, the initial data value relating to the channel for each of the one or more image element values being decompressed is determined by subtracting the determined difference value for the channel for the image element value from the origin value for the channel. In the two examples given in this paragraph above, precautions may be taken to ensure that there is not a carry from the LSBs that have been added to the difference values into the more significant bits of the decompressed data values. For example, an overflow may be detected and in response to detecting the overflow the decompressed data values may be clamped to an appropriate maximum value. Similarly, an underflow may be detected and in response to detecting the underflow the decompressed data values may be clamped to an appropriate minimum value.

In a further example, for each of the channels, the initial data value relating to the channel for each of the one or more image element values being decompressed may be determined by combining the origin value for the channel and the determined difference value for the channel for the image element value using addition or subtraction in modular arithmetic. In this example, precautions may be taken to ensure that the decompressed value lies on the correct side of the modulus of the modular arithmetic. For example, if a block of four 8-bit data values for a channel are 251, 255, 0 and 1, then according to the example which uses modular arithmetic, the origin value can be set as 251 (i.e. 11111011 in binary), and the difference values can be 0, 4, 5 and 6. These difference values can be represented losslessly with three bits, as 000, 100, 101 and 110, so the first number of bits is three. In this example, the second number of bits for the channel for the block is determined to be two in order to satisfy the target level of compression. Naively, the difference values could be stored as 00, 10, 10 and 11, but that could result in the decompressed data values being 251, 255, 255 and 1 (if the LSBs added in the decompression unit are zeros). The loss of data in the third decompressed data value has changed it from a value of 0 to a value of 255, which could be very noticeable. Therefore, when the difference values are compressed, the compression unit can identify whether the rounding in a difference value will cause the resulting decompressed data value to cross over the modulus of the modular arithmetic, and if so then the rounding for that difference value can be modified to avoid crossing over the modulus of the modular arithmetic. It is noted that the compression unit is aware of how the compressed data will be decompressed, so it can determine whether the rounding in the difference value will cause the resulting decompressed data value to cross over the modulus of the modular arithmetic. For example, the third difference value in the example above can be rounded up rather than down (but the other three difference values will still be rounded down), so that the three difference values can be stored as 00, 10, 11 and 11 in the compressed data. This would result in the decompressed values being 251, 255, 1 and 1. The loss of data in the third data value has changed it from a value of 0 to a value of 1, which would be much less noticeable than changing it from 0 to 255.

In yet another example, the compressed block of data comprises a plurality of origin values for at least one of the channels, wherein an indication is included in the compressed block of data to indicate which of the plurality of origin values each of the difference values for said at least one of the channels has been determined from. In this example, for said at least one of the channels, the initial data value relating to the channel for each of the one or more image element values being decompressed is determined using: (i) the origin value for the channel indicated by the indication for the determined difference value for the channel for the image element value, and (ii) the determined difference value for the channel for the image element value.

The method passes from step S912 to step S808, which is described above.

As mentioned above, in some examples, one or more error correction indications may be included in the compressed block of data. The decompression unit 702 can determine one or more error correction indications based on the determined decompressed data values of the one or more image element values being decompressed. The error correction indications can be CRC bits which can be calculated in a known manner. The decompression unit 702 can read the one or more error correction indications from the compressed block of data. Then the decompression unit 702 can compare the determined one or more error correction indications with the one or more error correction indications read from the compressed block of data to determine whether there are errors in the determined decompressed data values of the one or more image element values being decompressed. If it is determined that there are no errors in the decompressed image element values then the image element values can be trusted and used with confidence. This is particularly useful in a system implementing functional safety. For example, the graphics processing system 102 may be configured to operate in accordance with a safety standard, such as the ISO 26262 standard if the graphics processing system 102 is being implemented in an automobile for rendering images which are considered to be safety critical (e.g. for rendering images including warning symbols to be displayed on a dashboard of a car). If the decompression unit 702 determines that there is an error in the determined decompressed data values then this means that an error has occurred in the transmission of the data between the compression unit 302 and the decompression unit 702 (e.g. when the compressed data has been transferred to or from a memory). In this case the decompression unit 702 can output an error signal to indicate that an error has occurred. The rest of the system may react to this error signal in any suitable manner, e.g. by discarding the decompressed block of image data and/or requesting that the block of image data is compressed and transmitted again.

Example Decompression

In the example of compressing a block of image data given above, in which the reference channel is the Green channel, the values of the four pixels in the block in the different channels are:

R=[17, 24, 9, 45]

G=[89, 100, 84, 119]

B=[240, 228, 215, 198]

A=[255, 255, 250, 255]

and the resulting compressed block of data has the following data for the four channels:

R: origin value=10110100, compression mode indicator=1, first number of bits=0011, difference values: [100, 000, 001, 010]

G: origin value=01010100, first number of bits=0110, difference values: [000101, 010000, 000000, 100011]

B: origin value=11000110, compression mode indicator=0, first number of bits=0110, difference values: [10101, 01111, 01000, 00000]

A: origin value=11111010, compression mode indicator=0, first number of bits=0011, difference values: [10, 10, 00, 10]

We now describe how all of the image element values of this compressed block of data can be decompressed by the decompression unit 702. In step S902, the first numbers of bits are read from the compressed block of data, and these first numbers of bits are 3, 6, 6 and 3 for the respective Red, Green, Blue and Alpha channels. In step S904, the decompression unit 702 will determine that if lossless compression were used then there would be 18 bits per image element value for the difference values, whereas the target level of compression (50%) only allows a maximum of 16 bits per image element value for the difference values in this example. The same algorithm is used as in the compression technique described above, so the difference value size determination logic 708 determines that the difference value sizes (i.e. the second numbers of bits) for the channels are R=3 bits, G=6 bits, B=5 bits and A=2 bits.

In step S906, the unpacker logic 710 reads the difference values from the compressed block of data in accordance with the determined second numbers of bits. In step S910, the unpacker logic 710 adds LSBs to the difference values where appropriate to form difference values having the first numbers of bits for each of the channels. In this example, the bits that are added are determined by bit replication (i.e. by replicating one or more MSBs of the difference values), so the difference values will be determined to be (where the bits in bold have been added by the unpacker logic to the difference values in the compressed block):

Red delta values: [100, 000, 001, 010] (in decimal: [4, 0, 1, 2])

Green delta values: [000101, 010000, 000000, 100011] (in decimal: [5, 16, 0, 35])

Blue delta values: [101011, 011110, 010000, 000000] (in decimal: [43, 30, 16, 0])

Alpha delta values: [101, 101, 000, 101] (in decimal: [5, 5, 0, 5])

In step S908 the initial data value determination logic 706 reads the origin values from the compressed block of data. In step S912 the initial data value determination logic 706 adds the difference values to the origin values to determine the initial data values of the decompressed image element values as:

Initial Red values determined as (in a signed two's complement format): 10110100+[100, 000, 001, 010]= [10111000, 10110100, 10110111, 10110110] (or in decimal: −76+[4, 0, 1, 2]=[−72, −76, −75, −74])

Initial Green values determined as (in an unsigned integer format): 01010100+[000101, 010000, 000000, 100011]=[01011001, 01011100, 01010100, 01110111] (or in decimal: 84+[5, 16, 0, 35]=[89, 100, 84, 119])

Initial Blue values determined as (in an unsigned integer format): 11000110+[101011, 011110,010000,000000]= [11110001,11100100,11010110,11000110] (or in decimal: 198+[43, 30, 16, 0]=[241, 228, 214, 198])

Initial Alpha values determined as (in an unsigned integer format): 11111010+[101, 101, 000, 101]=[11111111, 11111111, 11111010, 11111111] (or in decimal: 250+[5, 5, 0, 5]=[255, 255, 250, 255])

The Green, Blue and Alpha channels were compressed using the non-channel decorrelating mode so in step S814 the channel decorrelation logic 712 determines that the decompressed data values for the Green Blue and Alpha channels are the initial data values for the Green, Blue and Alpha channels respectively. However, the Red channel was compressed using the channel decorrelating mode so in step S812 the channel decorrelation logic 712 determines that the decompressed data values for the Red channel are the sum of the initial data values for the Red and Green channels. So the decompressed data values for the Red channel are determined to be [−72, −76, −75, −74]+[89, 100, 84, 119] =[17, 24, 9, 45]. In this example, there is no underflow in the red channel, i.e. all of the values are >0. It is possible that underflow may occur when the channel decorrelating mode is used, and if that is the case then any negative decompressed data values are clamped to zero.

By comparing these decompressed values with the original input values, it can be seen that in this example, some small errors have been introduced into the Blue channel but not into the Green, Red and Alpha channels. The errors are smaller in all of the channels than they would have been had the Red channel been compressed using the non-channel decorrelating mode.

As described above, some of the examples are described in detail herein with reference to a block of pixel data comprising pixel values, but more generally the compression and decompression processes can be performed in respect of a block of image data comprising image element values, wherein image element values may be pixel values, texel values, depth values, surface normal values or lighting values to give some examples.

All of the operations performed by the compression unit 302 and the decompression unit 702 described above are efficient to implement in hardware, e.g. with shifters, adders and comparators. The compression unit 302 and the decompression unit 702 do not perform complex operations such as division. Furthermore, no big caches or other types of large local memory are needed for the operation of the compression unit 302 and the decompression unit 702. For these reasons, the compression unit 302 and the decompression unit 702 are efficient to implement in hardware, which may result in smaller hardware (e.g. smaller silicon area), lower power consumption and/or lower latency of operation compared to more complex compression and decompression units. Furthermore, the same compression unit (e.g. compression unit 302) can perform lossless and lossy compression, so there is no need for two separate compression units if both lossless and lossy compression are desired to be implemented. Similarly, the same decompression unit (e.g. decompression unit 702) can perform lossless and lossy decompression on compressed blocks of data, so there is no need for two separate decompression units if both lossless and lossy decompression are desired to be implemented. Having a single compression unit and a single decompression unit configured to operate in both lossless and lossy manner reduces the amount of silicon area implemented in the compression and decompression units when both lossless and lossy techniques are desired (compared to implementing a lossless compression unit, a separate lossy compression unit, a lossless decompression unit and a separate lossy decompression unit).

In examples described above, each image element value comprises four 8-bit data values relating to Red, Green, Blue and Alpha channels respectively, such that each image element value is represented with 32 bits. In other examples, the data values may have different numbers of bits. As another example, each image element value may comprise three 10-bit data values relating to Red, Green and Blue channels respectively and a 2-bit data value relating to an Alpha channel, such that each image element value is represented with 32 bits. In these examples, the decorrelation may be performed on the Red and Blue channels (as non-reference channels) using the Green channel as the reference channel, but decorrelation might not be performed on the alpha channel. As another example, each image element value comprises four 10-bit data values relating to Red, Green, Blue and Alpha channels respectively, such that each image element value is represented with 40 bits.

Furthermore, in the examples described above, there is a single reference channel (e.g. the Green channel). However, in other examples, there may be more than one reference channel. For example, there may be four channels (e.g. RGBA) where two of the channels (e.g. the Green and the Blue channels) are reference channels and two of the channels (e.g. the Red and the Alpha channels) are non-reference channels. For the purposes of channel decorrelation (and channel recorrelation), a first of the non-reference channels (e.g. the Red channel) may reference a first of the reference channels (e.g. the Green channel), whilst a second of the non-reference channels (e.g. the Alpha channel) may reference a second of the reference channels (e.g. the Blue channel).

Figure 10:
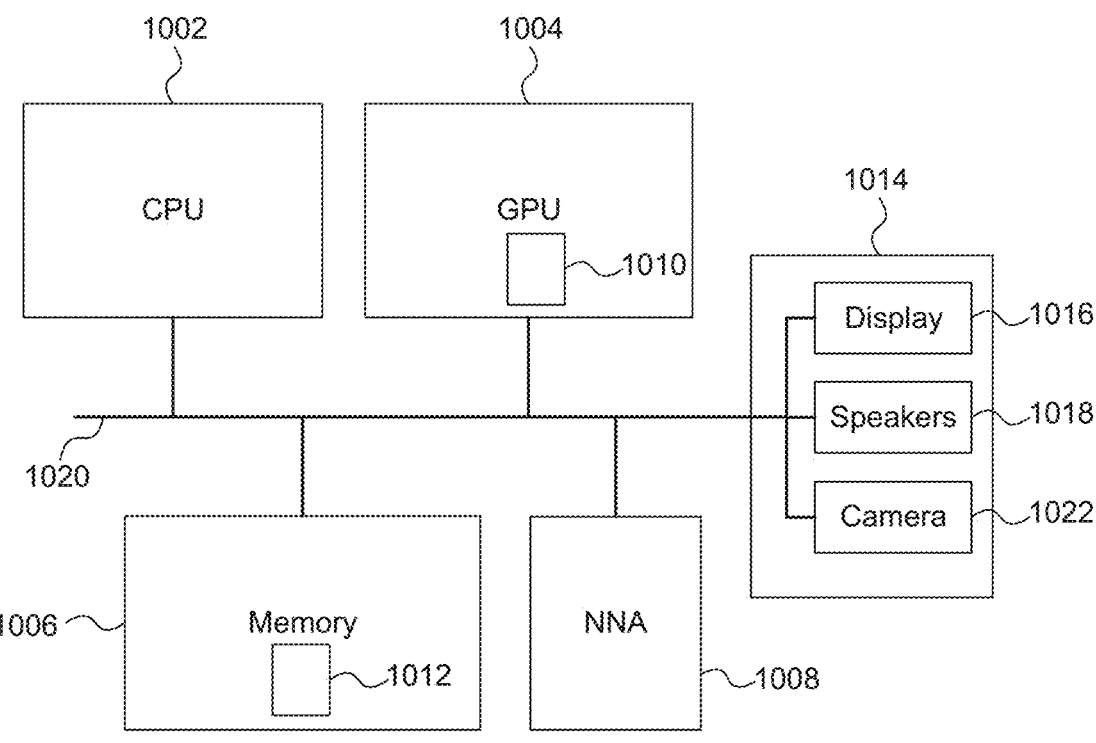
FIG. 10 shows a computer system in which a graphics processing system is implemented.

FIG. 10 shows a computer system in which the graphics processing systems described herein may be implemented. The computer system comprises a CPU 1002, a GPU 1004, a memory 1006, a neural network accelerator (NNA) 1008 and other devices 1014, such as a display 1016, speakers 1018 and a camera 1022. A processing block 1010 (corresponding to processing logic 106 and the compression unit 110 and decompression unit 112) is implemented on the GPU 1004. In other examples, one or more of the depicted components may be omitted from the system, and/or the processing block 1010 may be implemented on the CPU 1002 or within the NNA 1008. The components of the computer system can communicate with each other via a communications bus 1020. A store 1012 (corresponding to memory 104) is implemented as part of the memory 1006.

The compression units and decompression units of FIGS. 1, 3 and 7 are shown as comprising a number of functional blocks. This is schematic only and is not intended to define a strict division between different logic elements of such entities. Each functional block may be provided in any suitable manner. It is to be understood that intermediate values described herein as being formed by a compression unit and/or decompression unit need not be physically generated by the compression unit and/or decompression unit at any point and may merely represent logical values which conveniently describe the processing performed by the compression unit and/or decompression unit between its input and output.

The compression units and/or decompression units described herein may be embodied in hardware on an integrated circuit. The compression units and/or decompression units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a compression unit and/or decompression unit configured to perform any of the methods described herein, or to manufacture a compression unit and/or decompression unit comprising any apparatus described herein. An integrated circuit definition dataset may be, for example, an integrated circuit description.

Therefore, there may be provided a method of manufacturing, at an integrated circuit manufacturing system, a compression unit and/or decompression unit as described herein. Furthermore, there may be provided an integrated circuit definition dataset that, when processed in an integrated circuit manufacturing system, causes the method of manufacturing a compression unit and/or decompression unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a compression unit and/or decompression unit will now be described with respect to FIG. 11.

Figure 11:
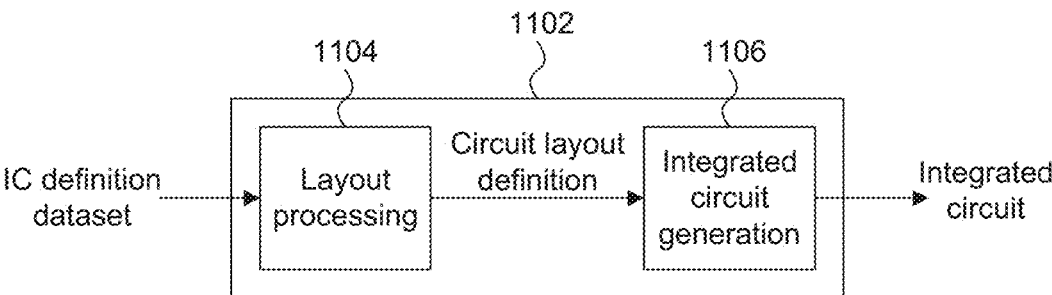
FIG. 11 shows an integrated circuit manufacturing system for generating an integrated circuit embodying a compression unit or a decompression unit as described herein.

FIG. 11 shows an example of an integrated circuit (IC) manufacturing system 1102 which is configured to manufacture a compression unit and/or decompression unit as described in any of the examples herein. In particular, the IC manufacturing system 1102 comprises a layout processing system 1104 and an integrated circuit generation system 1106. The IC manufacturing system 1102 is configured to receive an IC definition dataset (e.g. defining a compression unit and/or decompression unit as described in any of the examples herein), process the IC definition dataset, and generate an IC according to the IC definition dataset (e.g. which embodies a compression unit and/or decompression unit as described in any of the examples herein). The processing of the IC definition dataset configures the IC manufacturing system 1102 to manufacture an integrated circuit embodying a compression unit and/or decompression unit as described in any of the examples herein.

The layout processing system 1104 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1104 has determined the circuit layout it may output a circuit layout definition to the IC generation system 1106. A circuit layout definition may be, for example, a circuit layout description.

The IC generation system 1106 generates an IC according to the circuit layout definition, as is known in the art. For example, the IC generation system 1106 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1106 may be in the form of computer-readable code which the IC generation system 1106 can use to form a suitable mask for use in generating an IC.

The different processes performed by the IC manufacturing system 1102 may be implemented all in one location, e.g. by one party. Alternatively, the IC manufacturing system 1102 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a compression unit and/or decompression unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 11 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 11, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of performing decompression to determine one or more image element values from compressed data, wherein the compressed data represents a block of image data comprising a plurality of image element values, each image element value comprising a plurality of data values relating to a respective plurality of channels, wherein the plurality of channels comprises at least one reference channel and a plurality of non-reference channels, the method comprising:

reading, from the compressed data, compressed channel data for each of the channels;

for each of the channels, using the compressed channel data for the channel to determine an initial data value relating to the channel for each of the one or more image element values being decompressed;

for each of the one or more image element values being decompressed, determining a decompressed data value for each of the non-reference channels by:

reading, from the compressed data, an indication of a compression mode for the non-reference channel for the block, wherein the compression mode is either a channel decorrelating mode or a non-channel decorrelating mode, and if the compression mode for the non-reference channel is the non-channel decorrelating mode, determining the decompressed data value for the non-reference channel to be the determined initial data value relating to the non-reference channel for the image element value; and if the compression mode for the non-reference channel is the channel decorrelating mode, determining the decompressed data value for the non-reference channel to be a function of the determined initial data value relating to the non-reference channel and the determined initial data value relating to one of the at least one reference channel for the image element value.

2. The method of claim 1, wherein the compression mode for a first of the plurality of non-reference channels is the channel decorrelating mode, and wherein the compression mode for a second of the plurality of non-reference channels is the non-channel decorrelating mode.

3. The method of claim 1, wherein said function is a sum.

4. The method of claim 1, wherein for each of the one or more image element values being decompressed, for each of the at least one reference channel, the determined initial data value relating to the reference channel for the image element value is a decompressed data value for the reference channel.

5. The method of claim 1, wherein said reading compressed channel data for each of the channels comprises:

reading, from the compressed data, an indication of an origin value for each of the channels; and for each of the channels, reading representations of difference values from the compressed data, wherein the difference values for the channel represent differences between the data values and the origin value for the channel for the one or more image element values being decompressed from the compressed data;

wherein said, for each of the channels, using the compressed channel data for the channel to determine an initial data value relating to the channel for each of the one or more image element values being decompressed comprises:

for each of the channels, determining the initial data value relating to the channel for each of the one or more image element values being decompressed using: (i) the indication of the origin value for the channel read from the compressed data, and (ii) one of the representations of difference values read from the compressed data.

6. The method of claim 5, wherein said determining, for each of the channels, the initial data value relating to the channel for each of the one or more image element values being decompressed comprises summing the origin value for the channel and the determined difference value for the channel for the image element value.

7. The method of claim 5, wherein said determining, for each of the channels, the initial data value relating to the channel for each of the one or more image element values being decompressed comprises subtracting the determined difference value for the channel for the image element value from the origin value for the channel.

8. The method of claim 5, wherein for each of the non-reference channels the indication of the origin value for the non-reference channel is read from the compressed data as a number representing: (i) the origin value for the non-reference channel, or (ii) a difference between the origin value for the non-reference channel and the origin value for one of the at least one reference channel for the block.

9. The method of claim 5, wherein said reading compressed channel data for each of the channels further comprises:

reading, from the compressed data, for each of the channels, an indication of a first number of bits for the representations of the difference values for the channel;

wherein said determining the initial data values relating to the channels for each of the one or more image element values being decompressed comprises:

based on the representations of the difference values read from the compressed data, determining, for each of the channels and for each of the one or more image element values being decompressed, a difference value in accordance with said first number of bits for the channel.

10. The method of claim 9, wherein said determined difference value for a channel for an image element value has said first number of bits for the channel.

11. The method claim 9, wherein for each of the channels each of the representations of the difference values for the channel has the first number of bits for the channel.

12. The method of claim 9, wherein said reading representations of difference values from the compressed data comprises:

obtaining, for each of the channels, a second number of bits, wherein each of the representations of the difference values for each of the channels has the second number of bits for that channel; and using the obtained second numbers of bits for the respective channels to read the representations of the difference values for the one or more image element values being decompressed from the compressed data.

13. The method of claim 12, wherein said determining, for each of the channels and for each of the one or more image element values being decompressed, a difference value in accordance with said first number of bits for the channel comprises adding zero, one or more least significant bits to the representations of the difference values read from the compressed data to thereby determine the difference values having said first number of bits for each of the channels.

14. The method of claim 13, wherein the zero, one or more least significant bits which are added to the representations of the difference values read from the compressed data are determined by bit replication of a corresponding zero, one or more most significant bits of the representations of the difference values read from the compressed data.

15. The method of claim 12, wherein said obtaining, for each of the one or more channels, a second number of bits comprises using the first number of bits for each of the one or more channels to determine the second number of bits for the channel in accordance with a predetermined scheme.

16. The method of claim 12, wherein said obtaining, for each of the one or more channels, a second number of bits comprises reading an indication of said second number of bits for the channel from the compressed data.

17. The method of claim 5, wherein the compressed data is in a compressed block of data comprising:

a header portion, which has a fixed size, and which comprises: (i) the indication of the origin value for each of the channels, and (ii) the indication of the compression mode for each of the non-reference channels; and a body portion, which has a variable size, and which comprises the representations of the difference values for each of the channels.

18. The method of claim 9, wherein the compressed data is in a compressed block of data comprising:

a header portion, which has a fixed size, and which comprises: (i) the indication of the origin value for each of the channels, and (ii) the indication of the compression mode for each of the non-reference channels; and a body portion, which has a variable size, and which comprises the representations of the difference values for each of the channels, wherein the header portion further comprises the indication of the first number of bits for each of the channels.

19. A decompression unit configured to perform decompression to determine one or more image element values from compressed data, wherein the compressed data represents a block of image data comprising a plurality of image element values, each image element value comprising a plurality of data values relating to a respective plurality of channels, wherein the plurality of channels comprises at least one reference channel and a plurality of non-reference channels, the decompression unit comprising:

decompression logic configured to:

read, from the compressed data, compressed channel data for each of the channels, and for each of the channels, use the compressed channel data for the channel to determine an initial data value relating to the channel for each of the one or more image element values being decompressed; and channel decorrelation logic configured to determine, for each of the one or more image element values being decompressed, a decompressed data value for each of the non-reference channels by:

reading, from the compressed data, an indication of a compression mode for the non-reference channel for the block, wherein the compression mode is either a channel decorrelating mode or a non-channel decorrelating mode, if the compression mode for the non-reference channel is the non-channel decorrelating mode, determining the decompressed data value for the non-reference channel to be the determined initial data value relating to the non-reference channel for the image element value, and if the compression mode for the non-reference channel is the channel decorrelating mode, determining the decompressed data value for the non-reference channel to be a function of the determined initial data value relating to the non-reference channel and the determined initial data value relating to one of the at least one reference channel for the image element value.

20. A non-transitory computer readable storage medium having stored thereon an integrated circuit definition dataset that, when processed in an integrated circuit manufacturing system, configures the integrated circuit manufacturing system to manufacture a decompression unit which is configured to perform decompression to determine one or more image element values from compressed data, wherein the compressed data represents a block of image data comprising a plurality of image element values, each image element value comprising a plurality of data values relating to a respective plurality of channels, wherein the plurality of channels comprises at least one reference channel and a plurality of non-reference channels, the decompression unit comprising:

decompression logic configured to:

read, from the compressed data, compressed channel data for each of the channels, and for each of the channels, use the compressed channel data for the channel to determine an initial data value relating to the channel for each of the one or more image element values being decompressed; and channel decorrelation logic configured to determine, for each of the one or more image element values being decompressed, a decompressed data value for each of the non-reference channels by:

reading, from the compressed data, an indication of a compression mode for the non-reference channel for the block, wherein the compression mode is either a channel decorrelating mode or a non-channel decorrelating mode, if the compression mode for the non-reference channel is the non-channel decorrelating mode, determining the decompressed data value for the non-reference channel to be the determined initial data value relating to the non-reference channel for the image element value, and if the compression mode for the non-reference channel is the channel decorrelating mode, determining the decompressed data value for the non-reference channel to be a function of the determined initial data value relating to the non-reference channel and the determined initial data value relating to one of the at least one reference channel for the image element value.

\* \* \* \* \*